(12) United States Patent (10) Patent No.: US 9,378,044 B1
Gaurav et al. (45) Date of Patent: Jun. 28, 2016

(54) METHOD AND SYSTEM THAT ANTICIPATES DELETERIOUS VIRTUAL-MACHINE STATE CHANGES WITHIN A VIRTUALIZATION LAYER

(71) Applicant: VMWARE, INC., Palo Alto, CA (US)

(72) Inventors: Kumar Gaurav, Bangalore (IN); Piyush Bharat Masrani, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/740,284

(22) Filed: Jun. 16, 2015

(30) Foreign Application Priority Data

Mar. 28, 2015 (IN) .......................... 1611/CHE/2015

(51) Int. Cl.
*G06F 9/455* (2006.01)
*G06F 9/50* (2006.01)
*G06N 3/08* (2006.01)

(52) U.S. Cl.
CPC .............. *G06F 9/45558* (2013.01); *G06F 9/50* (2013.01); *G06F 9/5077* (2013.01); *G06N 3/08* (2013.01)

(58) Field of Classification Search
CPC ................................ G06F 9/45558; G06F 9/50
USPC .............................................. 718/1, 100–108
See application file for complete search history.

(56) References Cited

U.S. PATENT DOCUMENTS

| | | | | |
|---|---|---|---|---|
| 7,451,449 B2 * | 11/2008 | Thompson | ............. | G06Q 10/06 705/7.14 |
| 8,291,411 B2 * | 10/2012 | Beaty | .................... | G06F 9/4856 718/1 |
| 8,312,463 B2 * | 11/2012 | Smith | .................... | G06F 9/5011 718/104 |
| 8,321,862 B2 * | 11/2012 | Swamy | .................... | G06F 9/455 718/1 |
| 8,522,245 B2 * | 8/2013 | Chung | .................... | G06F 9/5011 718/102 |
| 8,607,234 B2 * | 12/2013 | Memik | ................. | G06F 9/3824 711/151 |
| 8,826,277 B2 * | 9/2014 | Chang | ................. | G06F 9/45545 707/602 |
| 8,839,255 B2 * | 9/2014 | Memik | ................. | G06F 9/3851 711/151 |
| 8,875,149 B2 * | 10/2014 | Slater | ........................ | G06F 9/52 718/103 |

OTHER PUBLICATIONS

Kim et al, "Task-aware Virtual Machine Scheduling for I/O Performance", ACM, pp. 101-110, 2009.*
Masrur et al, "Designing VM Schedulers for Embedded Real-Time Applications ", ACM, pp. 29-38, 2011.*
Akhani et al, "Negotiation for Resource Allocation in IaaS Cloud", ACM, pp. 1-7, 2011.*

(Continued)

*Primary Examiner* — Anil Khatri

(57) ABSTRACT

The current document is directed to a machine-learning-based subsystem, included within a virtualization layer, that learns, over time, how to accurately predict operational characteristics for the virtual machines executing within the virtual execution environment provided by the virtualization layer that result from changes to the states of the virtual machines. When the virtualization layer receives requests that, if satisfied, would result in a change of the state of one or more virtual machines, the virtualization layer uses operational characteristics predicted by the machine-learning-based subsystem from virtual-machine resource-allocation states that would obtain by satisfying the requests. When the predicted operational characteristics are indicative of potential non-optimality, instability, or unpredictability of virtualized-computer-system operation, the virtualization layer anticipates a deleterious state change and undertakes preventative measures.

19 Claims, 34 Drawing Sheets

(56) References Cited

OTHER PUBLICATIONS

Lama et al, "Aroma: Automated Resource Allocation and Configuration of MapReduce Environment in the Cloud ", ACM, pp. 63-72, 2012.*

Bartolini et al, "Automated Fine-Grained CPU Provisioning for Virtual Machines", ACM Transactions on Architecture and Code Optimization, vol. 11, No. 3, Article 27, pp. 1-25, 2014.*

Chen et al, "A New Machine Double-Layer Learning Method and Its Application in Non-Linear Time Series Forecasting ", IEEE, pp. 795-799, 2007.*

* cited by examiner

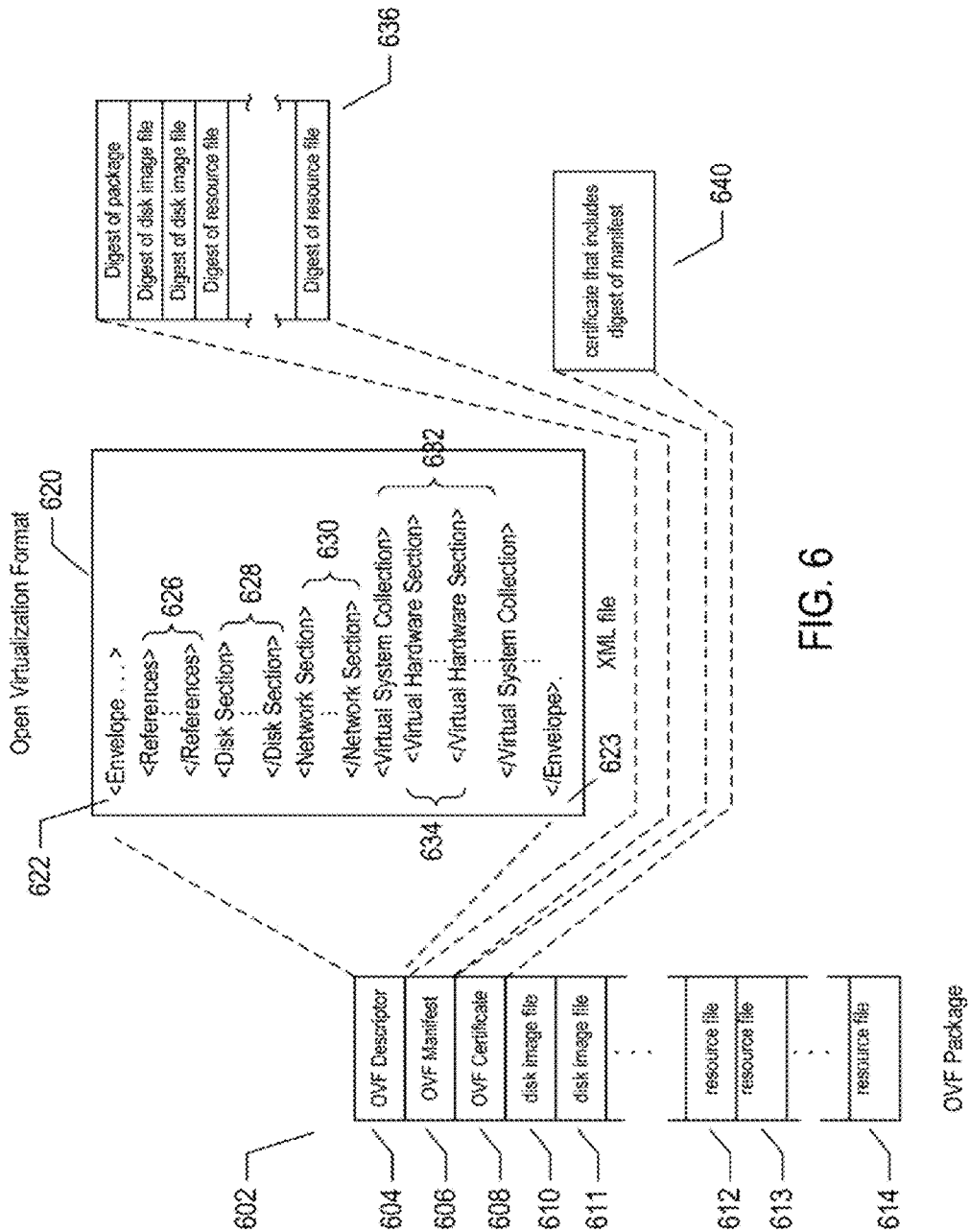

```
2402 ⎰ #include <stdio.h>
     ⎨ #include <tchar.h>
     ⎱ #include <math.h>

2403 ⎧ const int MAX_LEVELS = 10;
     ⎪ const int MAX_INPUTS = 100;
     ⎨ const int MAX_OUTPUTS = 20;
     ⎩ const double alpha = 0.1;

2404 ⎰ typedef int* intPtr;
     ⎱ typedef double* doublePtr;

2405 ⎧ class configuration {
     ⎪     private:
     ⎪         int numInputVectors;
     ⎪         int inputVectorSize;
     ⎪         int numOutputVectors;
     ⎪         int outputVectorSize;
     ⎪         int numLevels;                          ⎫
     ⎪         int numNodes[MAX_LEVELS];               ⎬ 2407
     ⎪         int levelOffsets[MAX_LEVELS];           ⎪
     ⎪         intPtr map;                             ⎭
     ⎪         int nxt;
     ⎪     public:
     ⎨         ⎧ int getNumInputVectors() {return numInputVectors;};
     ⎪         ⎪ int getInputVectorSize() {return inputVectorSize;};
     ⎪         ⎪ int getNumOutputVectors() {return numOutputVectors;};
     ⎪         ⎪ int getOutputVectorSize() {return outputVectorSize;};
     ⎪   2416  ⎨ int getNumLevels() {return numLevels;};
     ⎪         ⎪ int getFirstInput(int level, int nodeNum); ⎫ 2417
     ⎪         ⎪ int getNextInput();                        ⎭
     ⎪         ⎪ int getNumInputs(int level, int nodeNum); ⎯ 2418
     ⎪         ⎪ int getNumberOfForwardPointersFrom (int level, int nod); ⎯ 2419
     ⎪         ⎩ int getNumNodes(int level) {return numNodes[level];};
     ⎪         configuration(int numIV, int iVSize, int numOV, int oVSize, ⎫ 2406
     ⎪                       intPtr map, int mapLength);                    ⎭
     ⎩ };
```

FIG. 24A

```
class node;

typedef node* NodePtr;

class node{
    private:
        double sum;                         ─── 2422
        double deltaSum;                    ─── 2423
        double output;                      ─── 2424
        int numInput;                       ─── 2425
        int numFedBack;                     ─── 2426
        int numInputs;                      ─── 2427
        double* weights;                    ─── 2428
        NodePtr* forwardLinks;              ─── 2429
        int numForwardLinks;                ─── 2430
        NodePtr* backwardLinks;             ─── 2431
        int numBackwardLinks;               ─── 2432
        doublePtr inputs;                   ─── 2433
        double (*f)(double);                ─── 2434
        double (*fDev)(double);             ─── 2435 public:
        double getOutput() {return output;};
        void addInput(double d, NodePtr from);
        void addInput(double d, int from);                    } 2437
        void addFeedback(double d);
        void clear() {sum = 0; deltaSum = 0; output = 0;
                      numInput = 0; numFedBack = 0;};
        void setNumInputs(int n) {numInputs = n;};
        void setForwardLinks(NodePtr* n) {forwardLinks = n;};
        void setNumForwardLinks(int n) {numForwardLinks = n;};
        void setForwardLink(NodePtr to)
              {*(forwardLinks + numForwardLinks++) = to;};
        void setBackwardLinks(NodePtr* n) {backwardLinks = n; };
        void setNumBackwardLinks(int k) {numBackwardLinks = k;};
        void setInputs(doublePtr d) {inputs = d;};
        void setBackwardLink(int k, NodePtr nxt) {*(backwardLinks + k) = nxt;};
        void setWeights(double* d) {weights = d;};
        void setFunction(double (*func)(double)) {f = func;};
        void setFunctionDev(double (*func)(double)) {fDev = func;};
        double getDeltaSum() {return deltaSum;};
        void setDeltaSum(double d) {deltaSum = d;};
};
```

```
class model {
    private:
        NodePtr level[MAX_LEVELS];           // 2442
        double (*f)(double);                  // 2443
        double (*fDev)(double);               // 2444
        configuration* config;                // 2445
        void clearNodes();                    // 2446
    public:
        void generateOutputVectors(doublePtr inputVectors,
                                   doublePtr outputVectors);           // 2447
        void learn(doublePtr inputVectors, doublePtr outputVectors,
                   doublePtr actualVectors);                            // 2448
        model(configuration* cfg, double (*nodeFunction)(double),
              double (*nodeFunctionDev)(double));                       // 2449
};
```
(2440 encompasses the class; 2441 marks the private members group)

```
int configuration::getNumberOfForwardPointersFrom(int level, int nod)
{
    int i = levelOffsets[level + 1];
    int num = 0;

do
    {
        if (map[i] == nod) num++;
        i++;
    } while (map[i] != -2);
    return num;
}
```
(2450)

```
int configuration::getFirstInput(int level, int nodeNum)
{
    int n = 0;
    int i = levelOffsets[level];

if (nodeNum != 0)
    {
        while (n < level)
        {
            if (map[i] == -1) n++;
            i++;
        }
    }
    nxt = i + 1;
    return map[i];
}
```
(2451)

```
int configuration::getNextInput()
{
    if (map[nxt] == -1) return -1;
    else return map[nxt++];
}
```
(2452)

FIG. 24C

```
int configuration::getNumInputs(int level, int nodeNum)
{
    int num = 1;

getFirstInput(level, nodeNum);
    while (getNextInput() >= 0) num++;
    return num;
}
```
2453

```
configuration::configuration(int numIV, int iVSize, int numOV, int oVSize, intPtr m, int mapLength)
{
    int i = 0;
    int curNode = 0;

numInputVectors = numIV;
    inputVectorSize = iVSize;
    numOutputVectors = numOV;
    outputVectorSize = oVSize;
    map = m;
    numLevels = 0;
    levelOffsets[0] = 0;

while (i < mapLength)
    {
        if (m[i] == -2)
        {
            numNodes[numLevels] = curNode;
            curNode = 0;
            numLevels++;
            levelOffsets[numLevels] = i + 1;
        }
        else if (m[i] == -1) curNode++;
        i++;
    }
}
```
2454

FIG. 24D

```
void node::addInput(double d, int from)
{
    int i;
    NodePtr p;

numInput++;
    inputs[from] = d;
    if (numInput == numInputs)
    {
        for (i = 0; i < numInputs; i++) sum += inputs[i] * weights[i];
        sum += -1 * weights[i];
        output = f(sum);
        for (i = 0; i < numForwardLinks; i++)
        {
            p = *(forwardLinks + i);
            p->addInput(output, this);
        }
    }
}
```
2455

```
void node::addInput(double d, NodePtr from)
{
    int i;
    NodePtr p;

numInput++;        ── 2457
    for (i = 0; i < numInputs; i++) if (backwardLinks[i] == from) break;
    inputs[i] = d;     ──── 2458
    if (numInput == numInputs) ──── 2459
    {
        for (i = 0; i < numInputs; i++) sum += inputs[i] * weights[i];
        sum += -1 * weights[i];                                          } 2460
        output = f(sum);
        for (i = 0; i < numForwardLinks; i++)
        {
            p = *(forwardLinks + i);                                     } 2461
            p->addInput(output, this);
        }
    }
}
```
2456

FIG. 24E

```
void node::addFeedback(double d)
{
    int i;
    double feedback;
    NodePtr p;

deltaSum += d;                                              // 2463
    numFedBack++;                                               // 2464
    if (numForwardLinks == 0 || numFedBack == numForwardLinks)  // 2465
    {
        feedback = fDev(sum) * deltaSum;                        // 2466
        for (i = 0; i < numBackwardLinks; i++)
        {
            p = *(backwardLinks + i);
            p->addFeedback(feedback * weights[i]);              // 2467
        }
        for (i = 0; i < numInputs; i++)
                                                                // 2468
            weights[i] = weights[i] + (alpha * inputs[i] * feedback);

weights[i] = weights[i] + (-alpha * feedback);          // 2469
    }
} void model::clearNodes()
{
    int i, j, k;

for (i = 0; i < config->getNumLevels(); i++)
    {
        k = config->getNumNodes(i);
        for (j = 0; j < k; j++) (level[i] + j)->clear();
    }
}
```
(2470 brackets the clearNodes function)

FIG. 24F

```
model::model(configuration* cfg, double (*nodeFunction)(double), double (*nodeFunctionDev)(double))
{
    int i, j, k, l;
    NodePtr nxt;
    int nxtInput;
    doublePtr dp;

f = nodeFunction;
    fDev = nodeFunctionDev;
    config = cfg;

for (i = 0; i < config->getNumLevels(); i++)
    {
        k = config->getNumNodes(i);
        level[i] = (NodePtr) new node[k];
        for (j = 0; j < k; j++)
        {
            (level[i] + j)->setFunction(nodeFunction);
            (level[i] + j)->setFunctionDev(nodeFunctionDev);
        }
    }
    for (i = 0; i < config->getNumLevels() - 1; i++)
    {
        for (j = 0; j < config->getNumNodes(i); j++)
        {
            k = config->getNumberOfForwardPointersFrom(i, j);
            (level[i] + j)->setNumForwardLinks(0);
            (level[i] + j)->setForwardLinks((NodePtr*)new NodePtr[k]);
        }
    }
    for (j = 0; j < config->getNumNodes(i); j++) (level[i] + j)->setNumForwardLinks(0);
    for (i = 0; i < config->getNumLevels(); i++)
    {
        for (j = 0; j < config->getNumNodes(i); j++)
        {
            k = config->getNumInputs(i, j);
            (level[i] + j)->setNumInputs(k);
            dp = (double*)new double[k + 1];
            for (l = 0; l < k + 1; l++) dp[l] = 1.0/(double)(k + 1.0);
            (level[i] + j)->setWeights(dp);
            (level[i] + j)->setInputs((double*)new double[k]);
            if (i > 0)
            {
                (level[i] + j)->setNumBackwardLinks(k);
                (level[i] + j)->setBackwardLinks((NodePtr*)new NodePtr[k]);
            }
            else
            {
                (level[i] + j)->setNumBackwardLinks(0);
                (level[i] + j)->setNumBackwardLinks(0);
            }
        }
    }
    for (i = 1; i < config->getNumLevels(); i++)
    {
        for (j = 0; j < config->getNumNodes(i); j++)
        {
            nxtInput = config->getFirstInput(i, j);
```

```
                    k = 0;
                    do
                    {
                        nxt = level[i - 1] + nxtInput;
2475                (level[i] + j)->setBackwardLink(k++, nxt);
                        nxt->setForwardLink(level[i] + j);
                        nxtInput = config->getNextInput();

} while (nxtInput > -1);
                }
            }
        } void model::generateOutputVectors(doublePtr inputVectors, doublePtr outputVectors)
        {
            int i, nxtInput, last;
            double d;
            NodePtr p = level[0];

clearNodes();

for (i = 0; i < config->getNumNodes(0); i++)
            {
                nxtInput = config->getFirstInput(0,i);
                do
                {
2476                d = inputVectors[nxtInput];                     2477
                    p->addInput(d, nxtInput);
                    nxtInput = config->getNextInput();
                } while (nxtInput > -1);
                p++;
            }
            last = config->getNumLevels() - 1;
            p = level[last];
            for (i = 0; i < config->getNumNodes(last); i++)
            {
                d = p++->getOutput();                               2478
                outputVectors[i] = d;
            }
        }
```

FIG. 24H

```
void model::learn(doublePtr inputVectors, doublePtr outputVectors, doublePtr actualVectors)
{
    int i, last;
    double delta;
    NodePtr p;

clearNodes();

generateOutputVectors(inputVectors, outputVectors);    ← 2481
    last = config->getNumLevels() - 1;
    p = level[last];
    for (i = 0; i < config->getNumNodes(last); i++)
    {
        delta = (actualVectors[i] - outputVectors[i]);
        p++->addFeedback(delta);
    }                                                       ⎬ 2482
}
```
2480

```
double sigmoidal (double d)
{
    return 1 / (1 + exp(-d));
}
```
2483

```
double sigmoidalDev (double d)
{
    return exp(d) / pow((exp(d) + 1), 2.0);
}
```
2484

FIG. 24I

```
int _tmain(int argc, _TCHAR* argv[])
{
    int i, j;
2487 ── int map[1186];
    int nxt = 0;
    double iVector[40] = {.4, .5, .7, .7, .5,
                          .7, .5, .7, .7, .5,
                          .2, .5, .7, .7, .5,
                          .2, .5, .7, .7, .5,
2486                      .3, .5, .7, .7, .5,
                          .4, .5, .7, .7, .1,
                          .6, .5, .7, .7, .5,
                          .6, .5, .7, .7, .5};
    double oVector[8];
    double aVector[8] = {.3, .3, .4, .4,
                         .2, .2, .1, .1};

for (i = 0; i < 24; i++)
    {
        for (j = 0; j < 40; j++) map[nxt++] = j;
        map[nxt++] = -1;
    }
    map[nxt++] = -2;
2488    for (i = 0; i < 8; i++)
    {
        for (j = 0; j < 24; j++) map[nxt++] = j;
        map[nxt++] = -1;
    }
    map[nxt++] = -2;

2489 ── configuration cfg(4, 10, 4, 2, map, 1186);
2490 ── model mod(&cfg, &sigmoidal, &sigmoidalDev);
2491 ── mod.generateOutputVectors(iVector, oVector);
2492 ── mod.learn(iVector, oVector, aVector);

return 0;
}
```

FIG. 24J

METHOD AND SYSTEM THAT ANTICIPATES DELETERIOUS VIRTUAL-MACHINE STATE CHANGES WITHIN A VIRTUALIZATION LAYER

RELATED APPLICATIONS

Benefit is claimed under 35 U.S.C. 119(a)-(d) to Foreign application Serial No. 1611/CHE/2015 filed in India entitled "METHOD AND SYSTEM THAT ANTICIPATES DELETERIOUS VIRTUAL-MACHINE STATE CHANGES WITHIN A VIRTUALIZATION LAYER", on Mar. 28, 2015, by VMware, Inc., which is herein incorporated in its entirety by reference for all purposes.

TECHNICAL FIELD

The current document is directed to virtualization layers and methods and, in particular, to a machine-learning-based virtualization-layer subsystem that anticipates deleterious changes to the resource-allocation states of one or more virtual machines executing within a virtual execution environment provided by the virtualization layer.

BACKGROUND

Virtualization layers, including hypervisors, provide virtual execution environments to virtual machines. A virtualization layer essentially provides a virtual machine interface above the hardware layer of a computer system. Among many functionalities provided by a virtualization layer, a virtualization layer allocates hardware resources to virtual machines. For example, a virtualization layer associates processes and threads running within a virtual machine with one or more hardware CPUs and schedules execution of the threads and processes on the assigned hardware CPUs in order to provide instruction-execution bandwidth to the virtual machine. Similarly, the virtualization layer allocates memory, data storage, and networking bandwidth to the virtual machines by partitioning memory, data-storage, and computational resources among the virtual machines. When the aggregate demand for one or more computational resources made by the virtual machines does not exceed a threshold percentage of the computational resources available from the computer-system hardware, the virtualization layer can provide optimal or near-optimal resource allocation on behalf of the virtual machines and the virtualized computer system can provide optimal or near-optimal computational throughput to virtual machines and processes and threads executing within virtual machines. However, when the aggregate demand for one or more computational resources approaches a threshold percentage of available hardware resources, the computational throughput for the executing virtual machines may become sub-optimal, the computational throughput for individual virtual machines may become unpredictable and sub-optimal, and virtualized-computer-system operational characteristics may become unstable. Non-optimal, unpredictable, and unstable behavior can be, to some extent, avoided by careful system monitoring and administration, but system administrators, designers, manufacturers, and vendors of virtualization layers, and designers, manufacturers, and vendors of computer systems, in general, continue to seek methods and systems that are less prone to non-optimal, unpredictable, and unstable operation.

SUMMARY

The current document is directed to a machine-learning-based subsystem, included within a virtualization layer, that learns, over time, how to accurately predict operational characteristics for the virtual machines executing within the virtual execution environment provided by the virtualization layer that result from changes to the states of the virtual machines. When the virtualization layer receives requests that, if satisfied, would result in a change of the state of one or more virtual machines, the virtualization layer uses operational characteristics predicted by the machine-learning-based subsystem from virtual-machine resource-allocation states that would obtain by satisfying the requests. When the predicted operational characteristics are indicative of potential non-optimality, instability, or unpredictability of virtualized-computer-system operation, the virtualization layer anticipates a deleterious state change and undertakes preventative measures.

BRIEF DESCRIPTION OF THE DRAWINGS

FIG. 6 illustrates an OVF package.

FIGS. 24A-J provide a simple C++ implementation of a neural network.

DETAILED DESCRIPTION OF EMBODIMENTS

The current document is directed to a machine-learning-based virtualization-layer subsystem that anticipates deleterious virtual-machine state changes so that the virtualization layer can forestall non-optimal, unstable, and unpredictable virtualized-computer-system operation. In a first subsection, below, a brief overview of virtualization technologies is provided with reference to FIGS. 1-10. A second subsection discusses resource allocation by a virtualization layer and resource-allocation-associated virtual-machine states with reference to FIGS. 11-16. In a final subsection, the virtualization-layer subsystem to which the current document is directed is described, in detail, with reference to FIGS. 17-24J.

Overview of Virtualization Technologies

Figure 1:
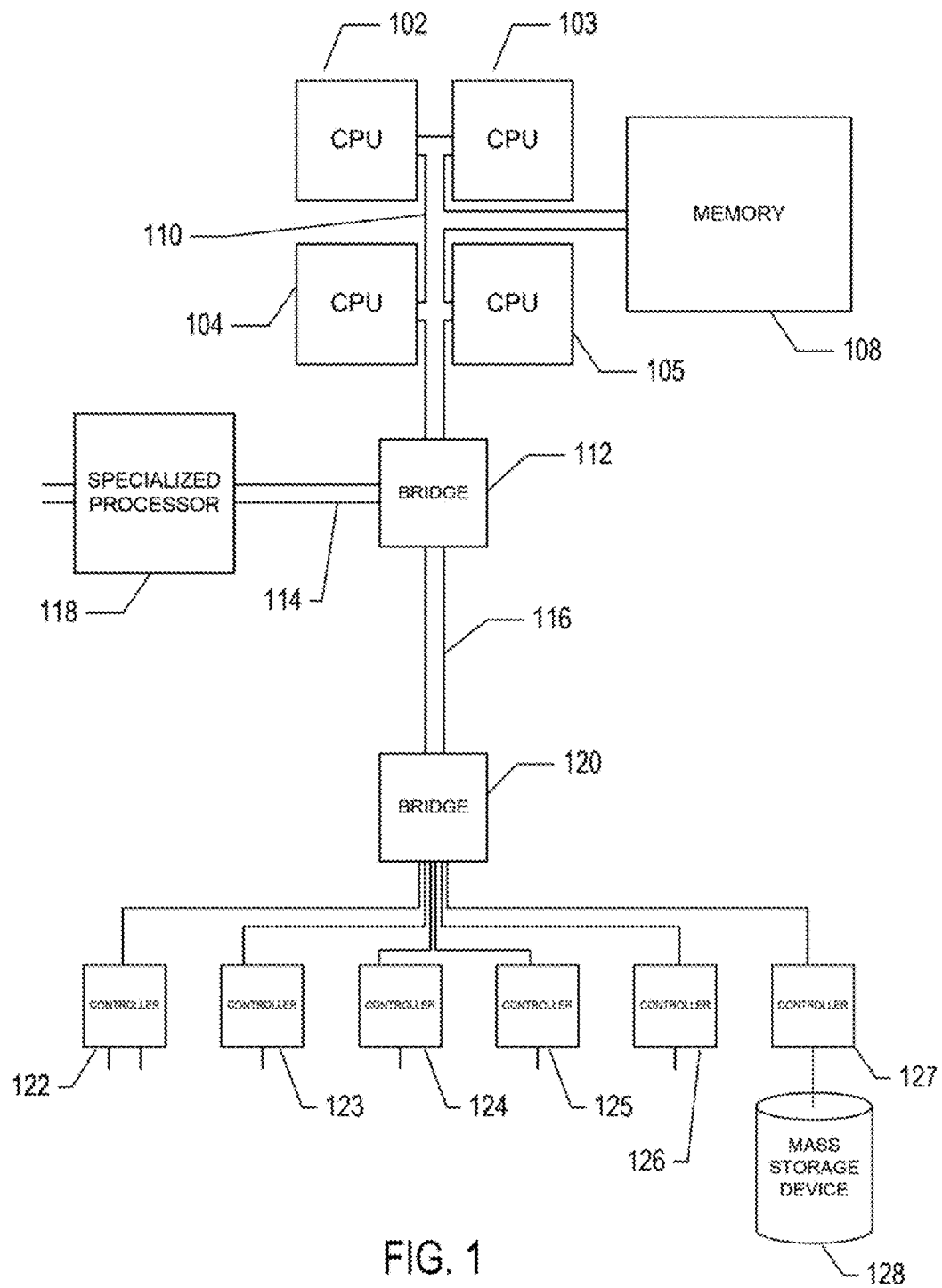
FIG. 1 provides a general architectural diagram for various types of computers.

FIG. 1 provides a general architectural diagram for various types of computers. Computers on which virtualization layers provide virtual execution environments for virtual machines may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
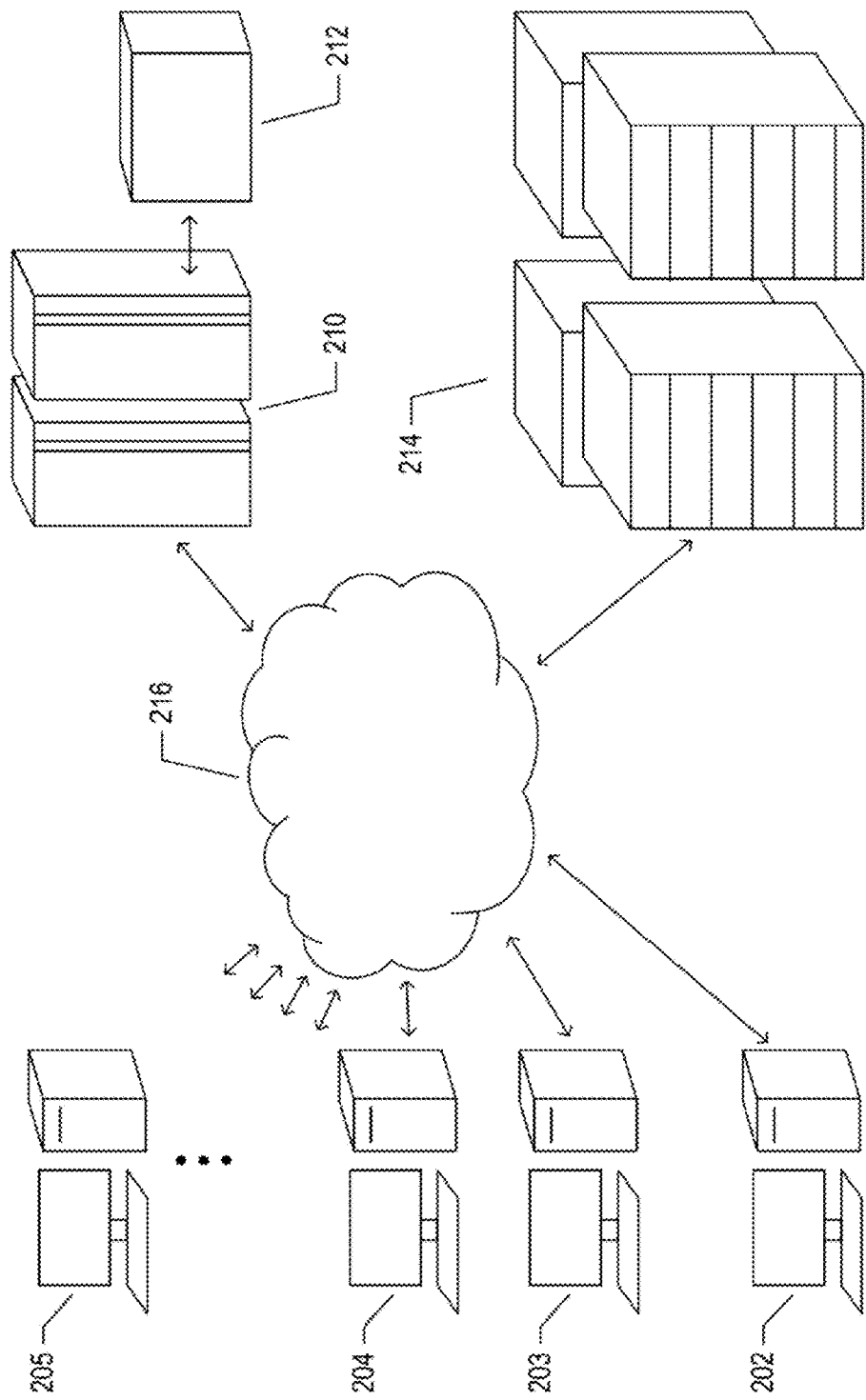
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
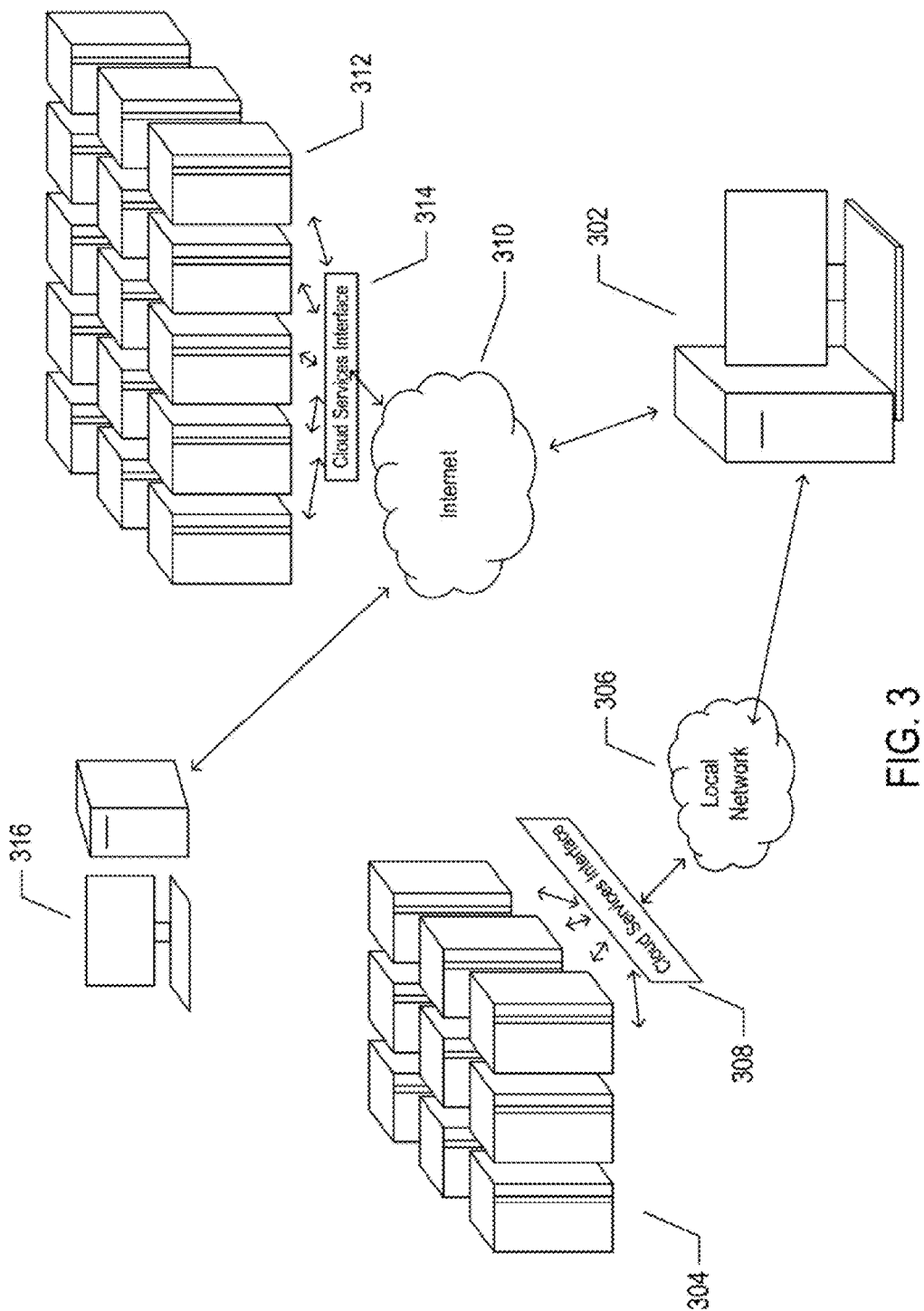
FIG. 3 illustrates cloud computing. In the recently developed cloud-computing paradigm, computing cycles and data-storage facilities are provided to organizations and individuals by cloud-computing providers.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
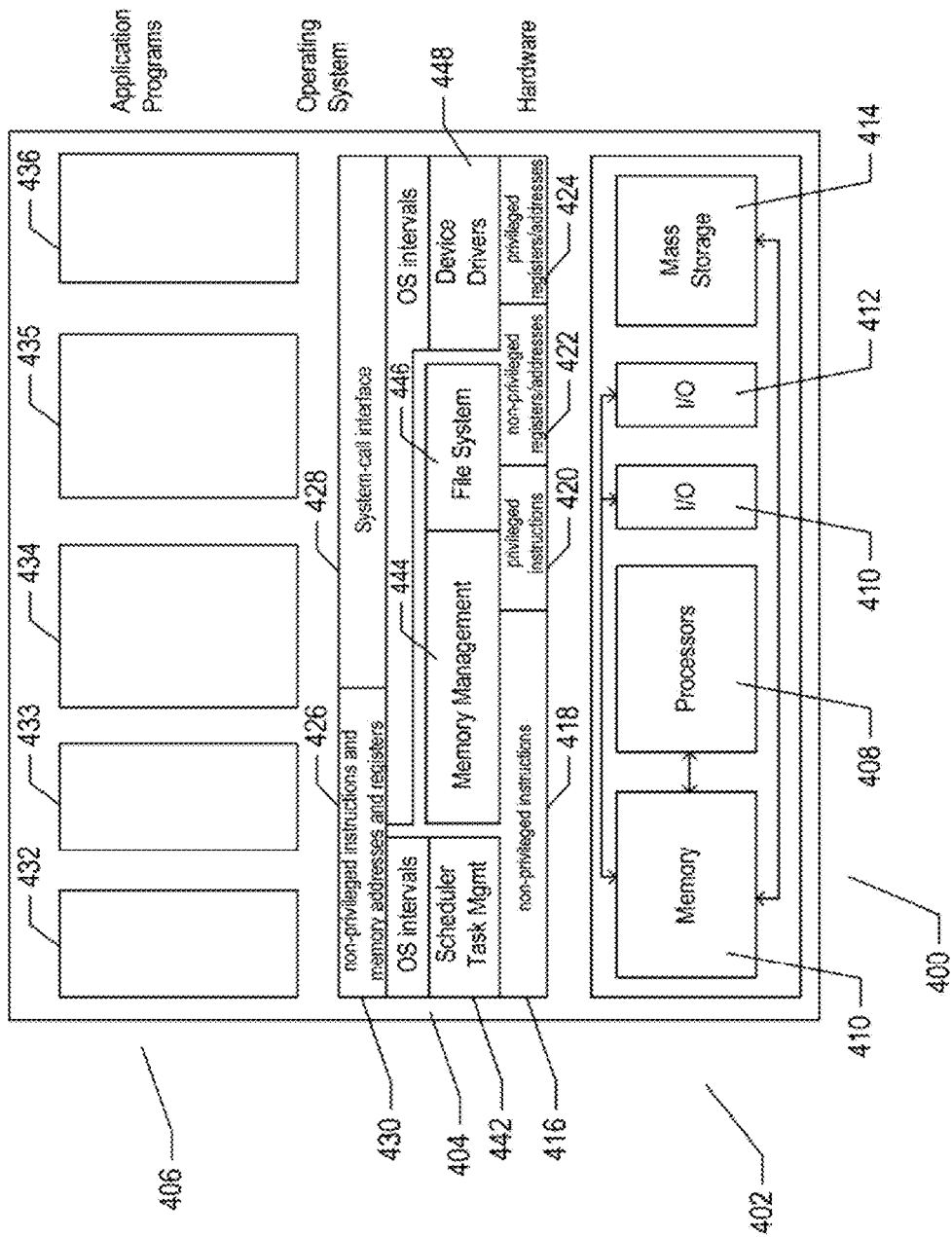
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
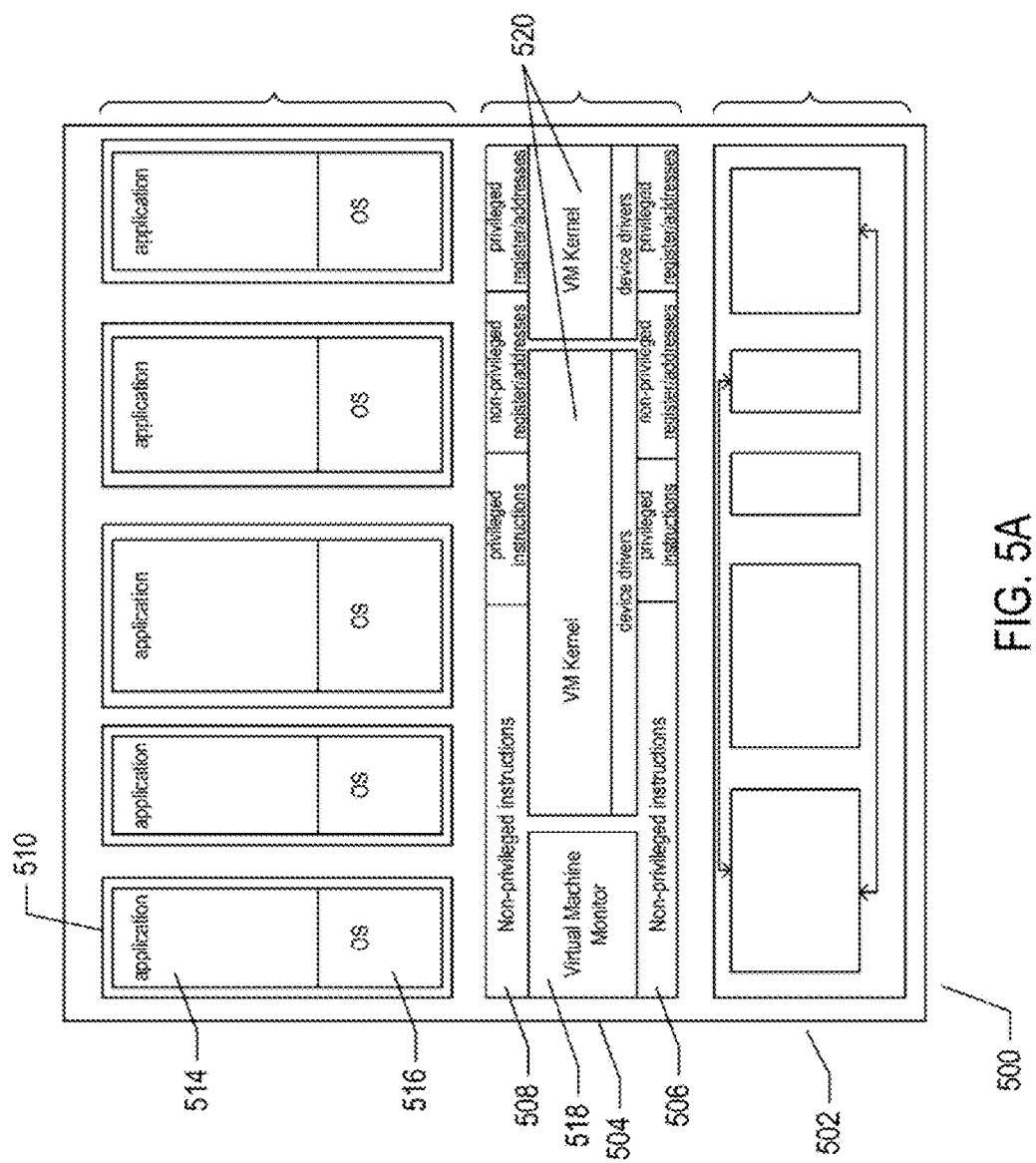
FIGS. 5A-B illustrate two types of virtual machine and virtual-machine execution environments.
Figure 5B:
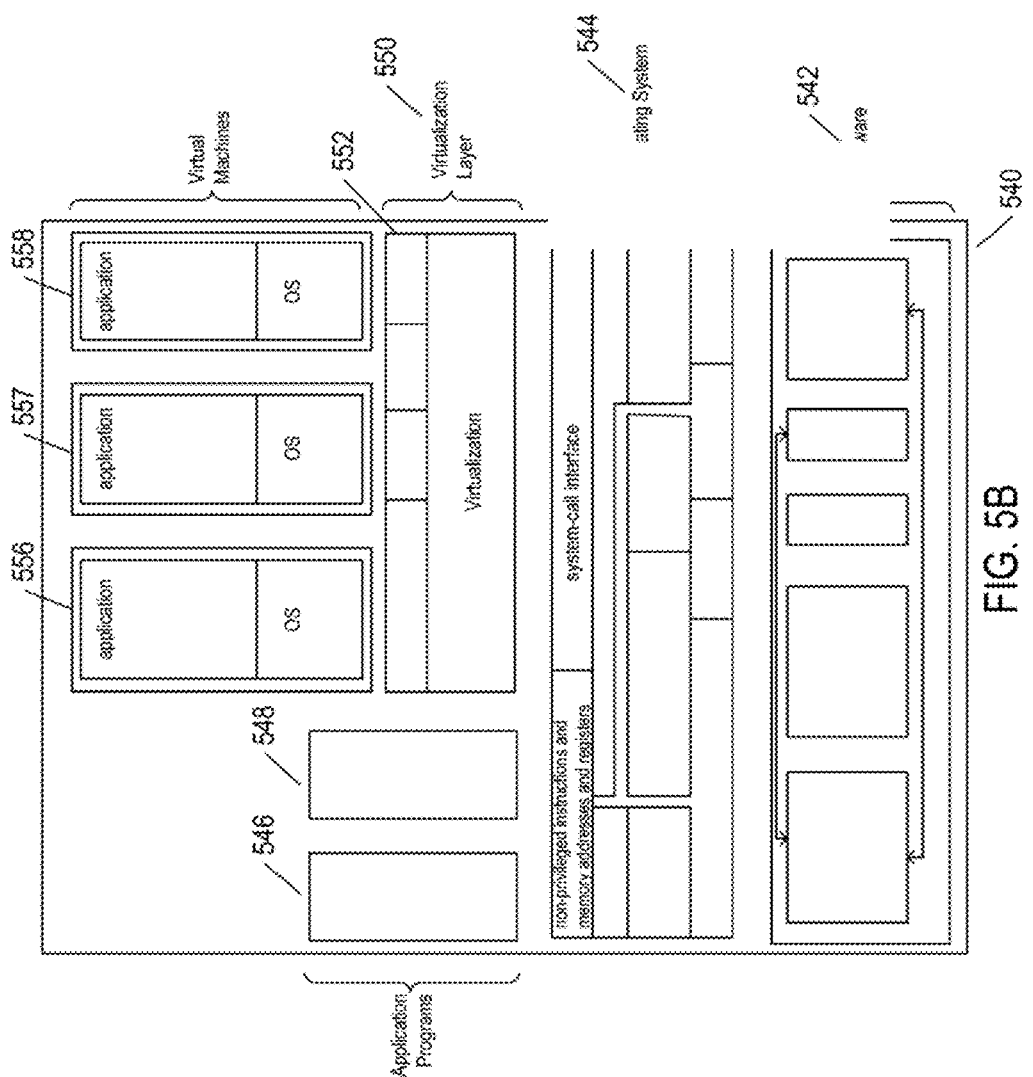

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. Figure 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM"), also referred to as a "hypervisor," that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
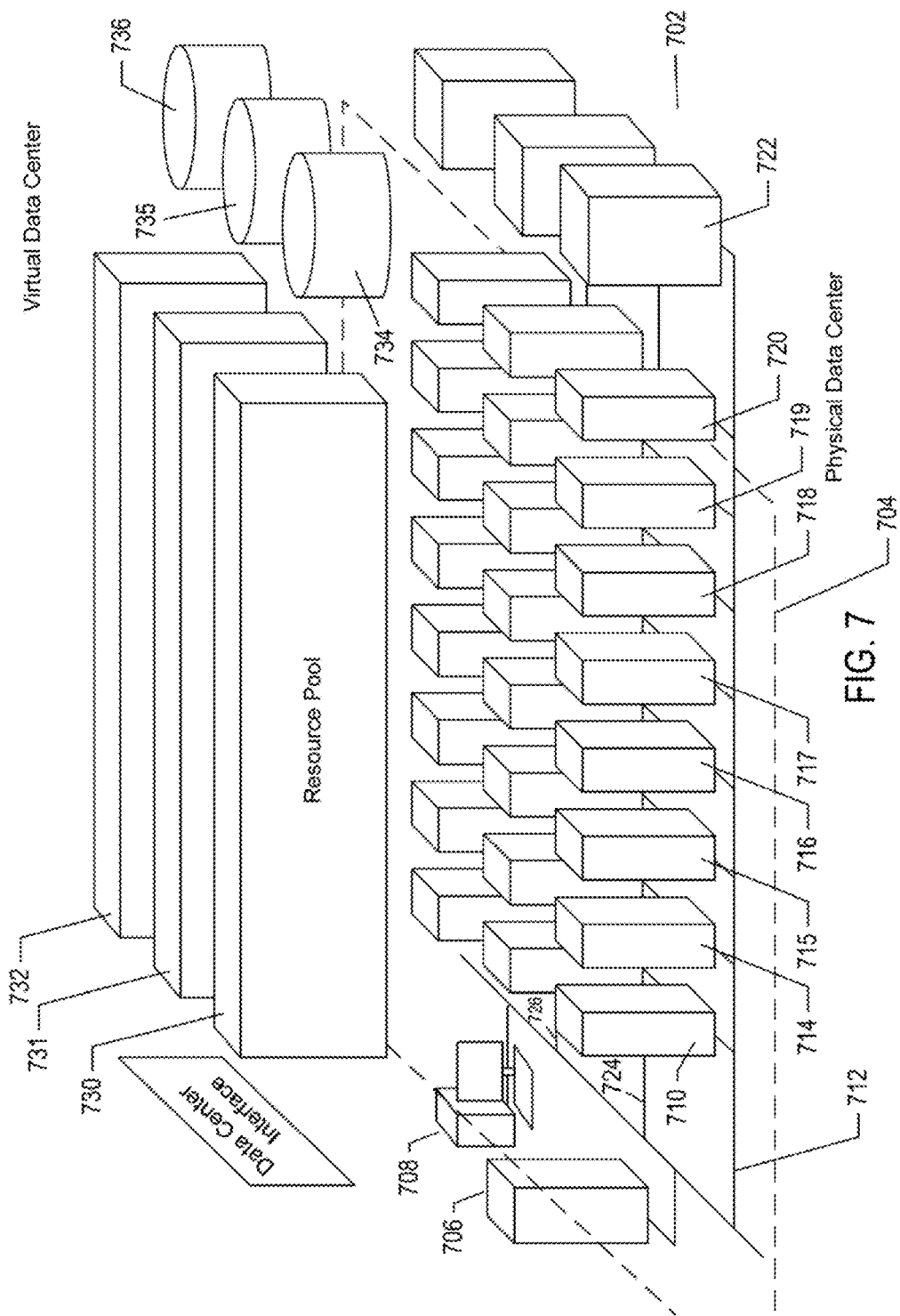
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the virtual-data-center management server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
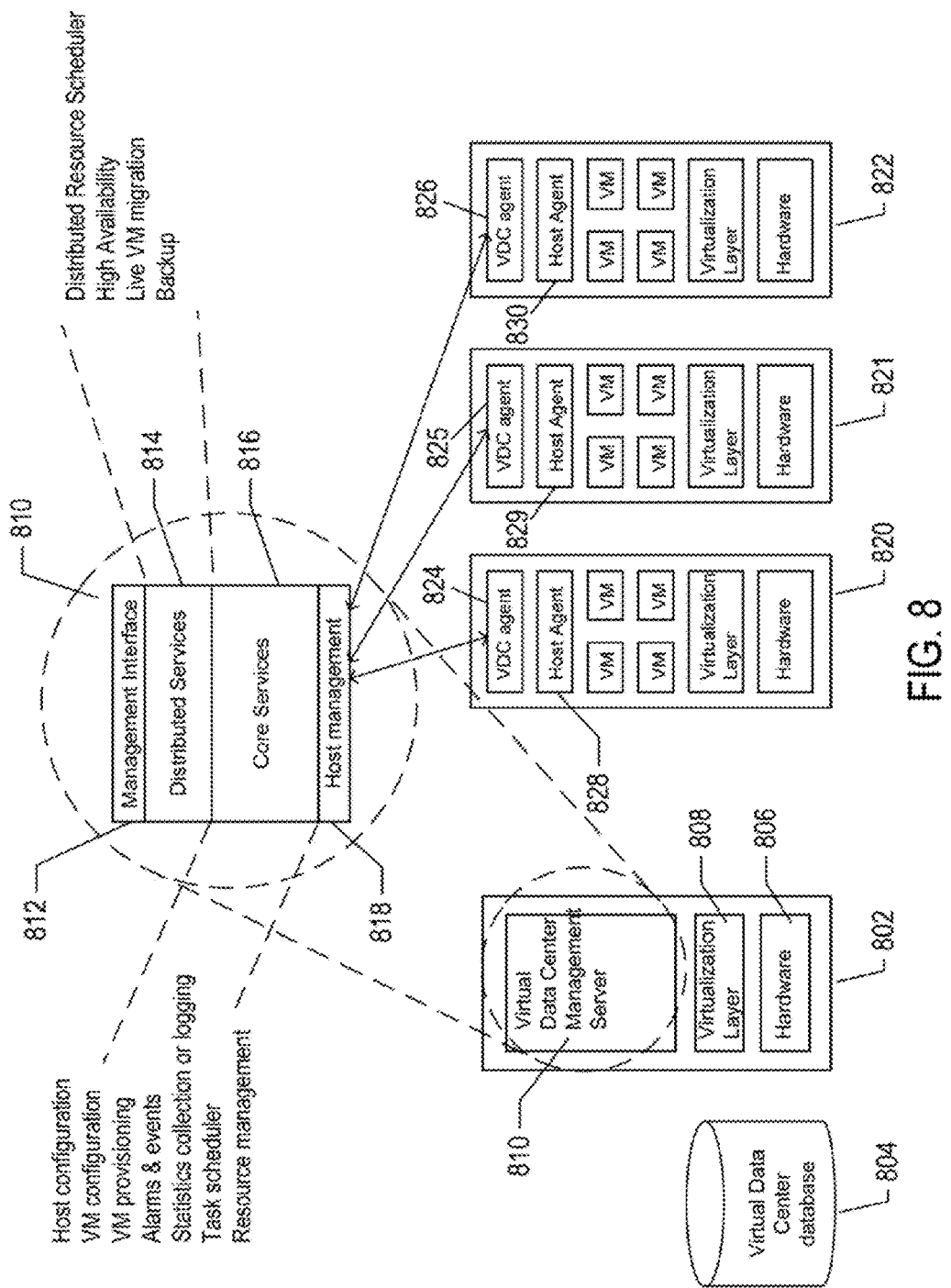
FIG. 8 illustrates virtual-machine components of a virtual-data-center management server and physical servers of a physical data center above which a virtual-data-center interface is provided by the virtual-data-center management server.

FIG. 8 illustrates virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server virtual machine 810 above the virtualization layer. Although shown as a single server in FIG. 8, the virtual-data-center management server ("VDC management server") may include two or more physical server computers that support multiple VDC-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VDC management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VDC management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VDC management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
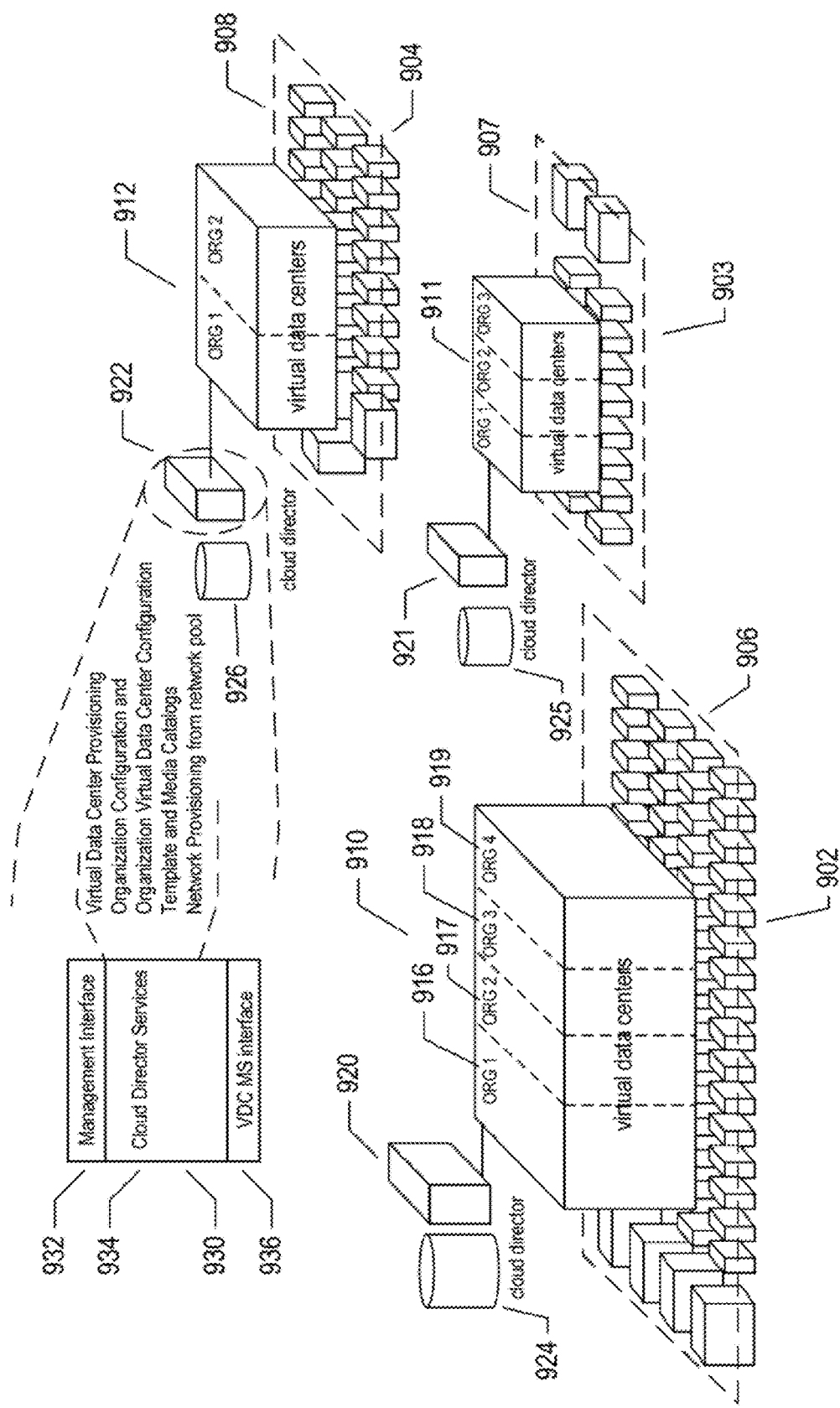
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
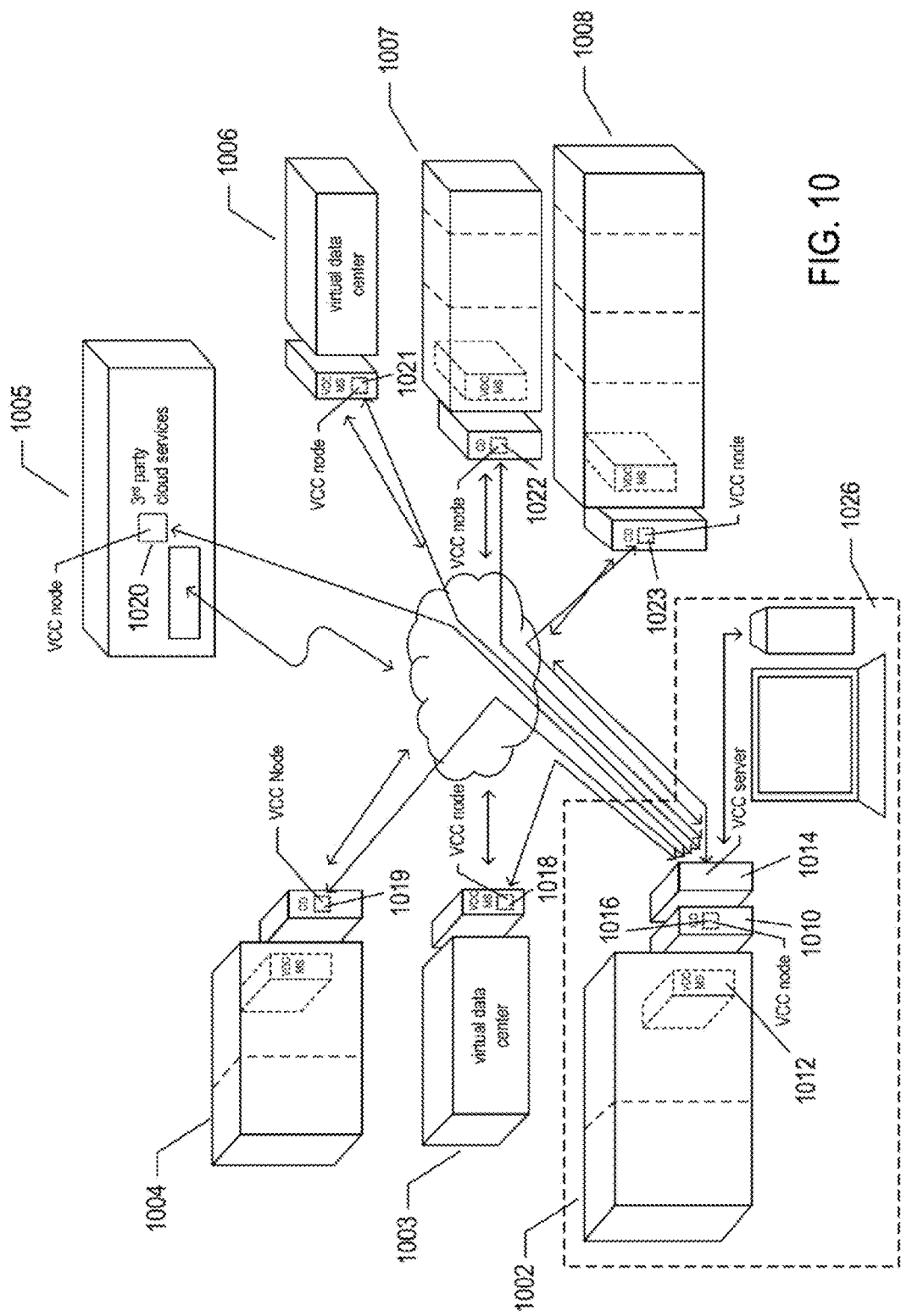
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Figure 11:
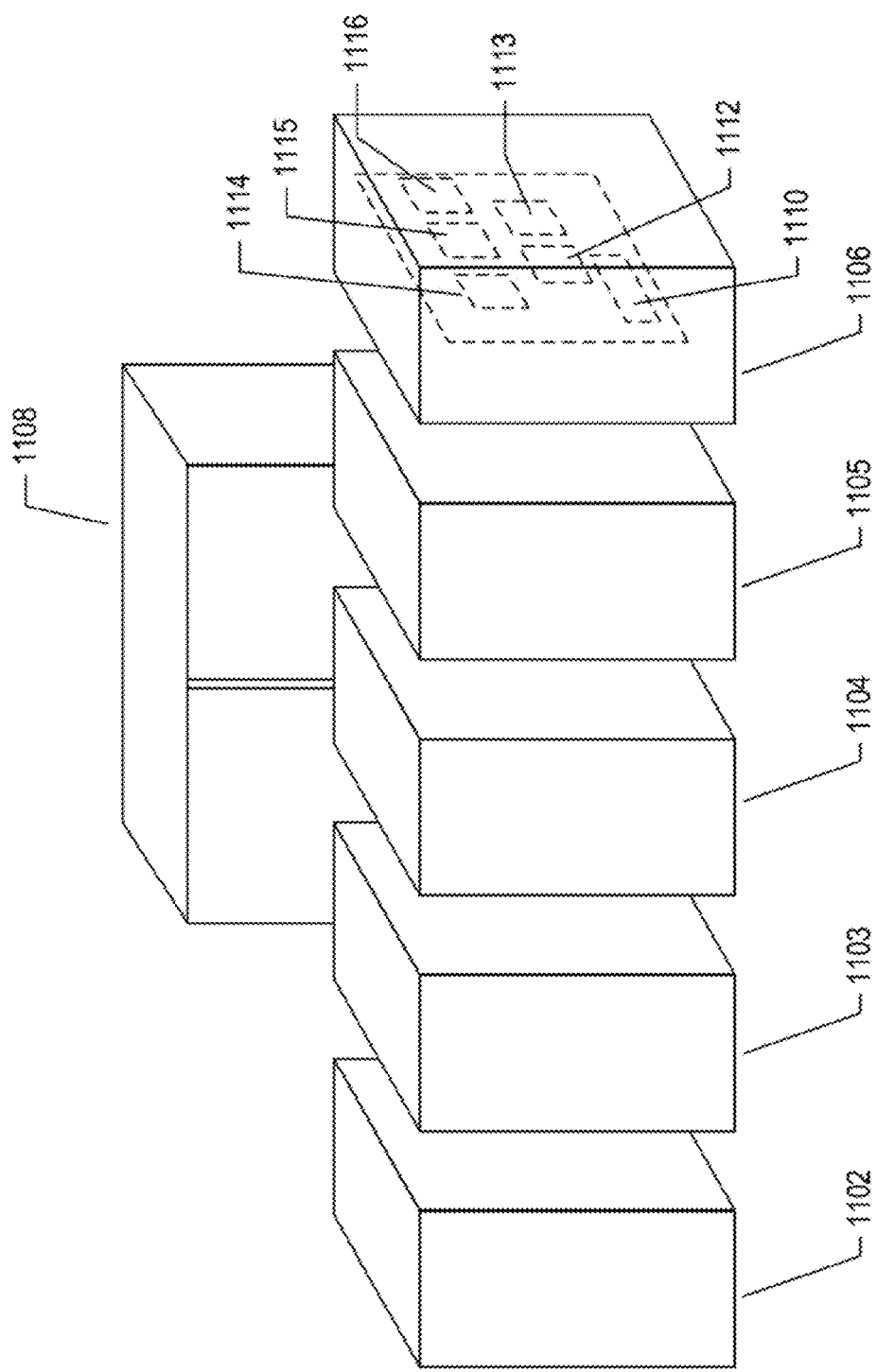
FIGS. 11-16 illustrate a resource pool.

Computational-Resource Allocation Among Virtual Machines and Associated Virtual-Machine States FIGS. 11-16 illustrate a resource pool, discussed briefly, above, with reference to FIG. 7. FIG. 11 shows a small cluster of physical computing machinery. In FIG. 11, five multi-processor servers 1102-1106 are shown along with a large data-storage-array enclosure 1108. Each of the server computers includes one or more network interconnect cards ("NICs") 1110, two or more processors 1112-1113, and generally multiple banks of integrated-circuit memory 1114-1116. The internal components of server 1106 are shown, in FIG. 11, as an example of the types of components contained within the remaining servers 1102-1105. Of course, server computers and storage arrays are extremely complex machines with hundreds to thousands of individual parts and subcomponents. FIG. 11 is intended only to illustrate the computing cluster at a high level.

Figure 12:
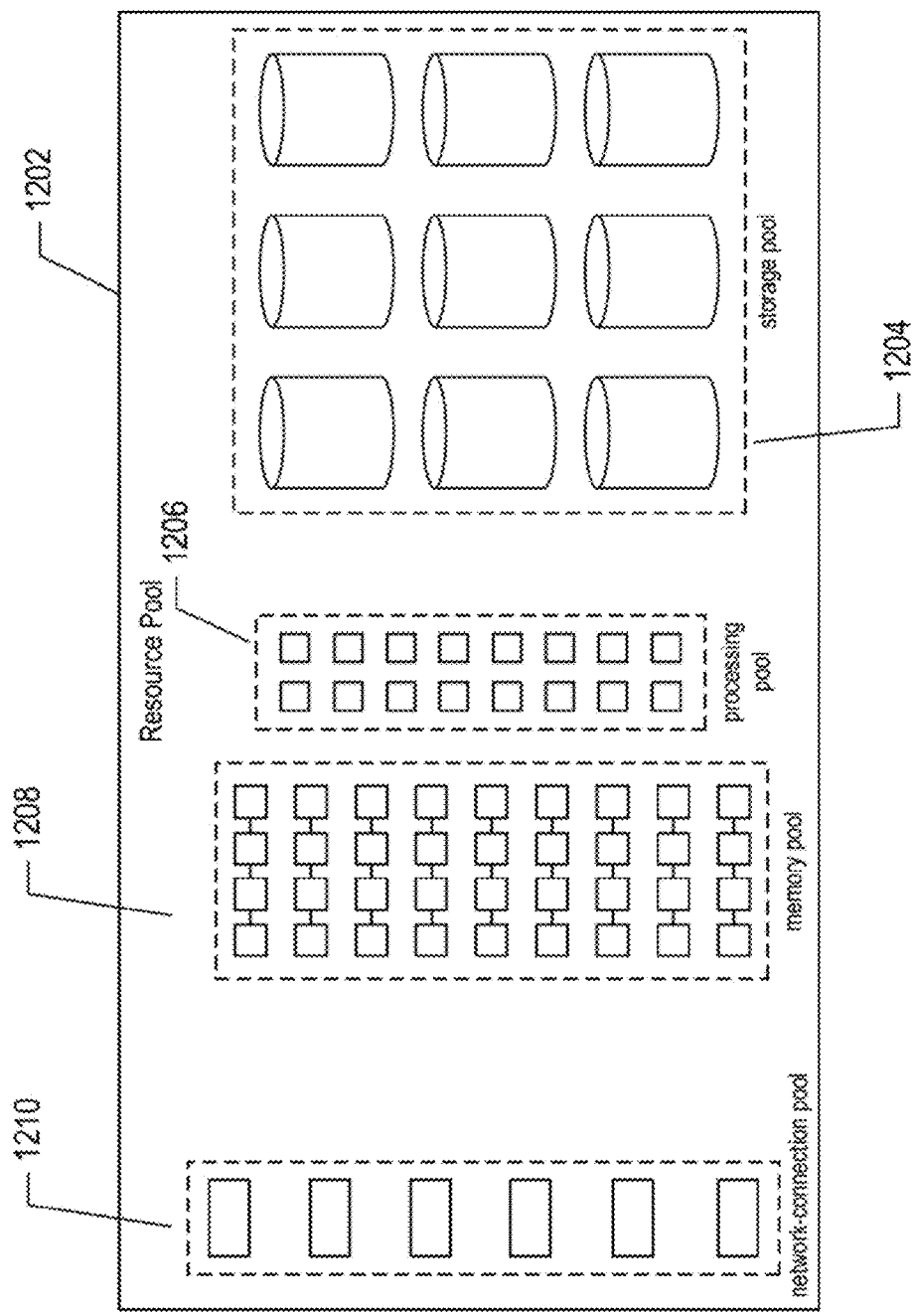

FIG. 12 illustrates abstraction of the computing resources contained in the cluster shown in FIG. 11 as a resource pool. The resource pool 1202 includes a data-storage pool 1204, a processing pool 1206, a memory pool 1208, and a network-connection pool 1210. The storage pool 1204 is an abstract collection or aggregation of the data-storage resources of the cluster available to virtual machines for data storage, including portions of internal disk drives within the server computers as well as disk drives and other data-storage devices within the data-storage array 1108. The processing pool 1206 is an abstract aggregation of the processing bandwidth provided by hardware threads, cores, and processors within the server computers 1102-1106. Similarly, the memory pool 1208 includes the memory resources contained in the server computers 1102-1106 that are accessible for use by virtual machines. The network-connection pool 1210 is an abstract aggregation of the NICs and/or other communications hardware within the server computers 1102-1106 available for transmitting and receiving data at the request of virtual machines. The resource-pool abstraction represents, to virtual machines within a virtualized computer system, an overall, aggregate set of resources that can be accessed by the virtual machines without specifying the types and numbers of individual devices and components that are aggregated together to provide the overall bandwidth and/capacity of the various component pools of the resource pool.

Figure 13:
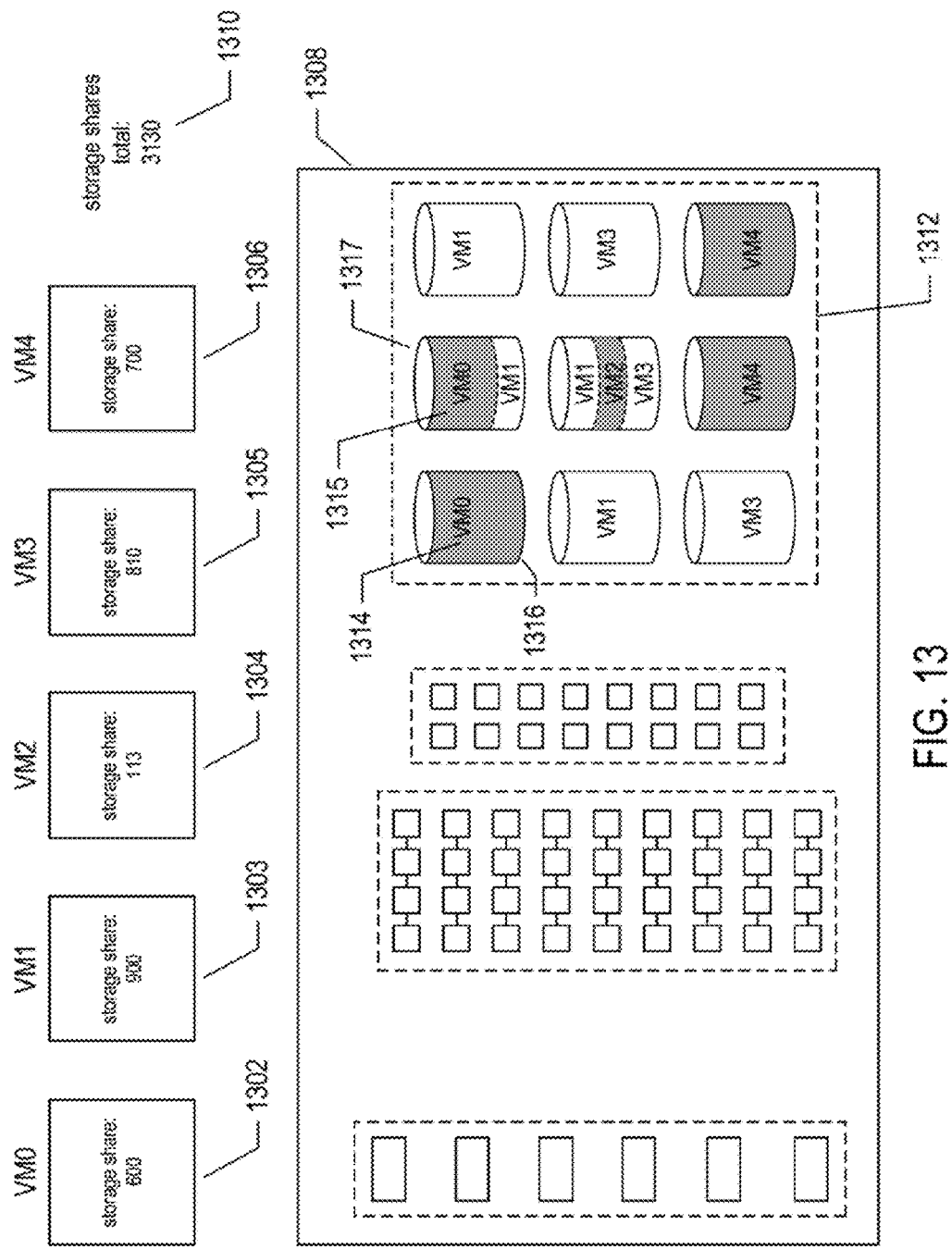

FIG. 13 illustrates allocation of resources from a resource pool to virtual machines within a virtual cluster, virtual data center, or other virtualized computer system by a cluster-management server, virtual-data-center management server, VCC server, or other such virtualized-computer-system management component. In FIG. 13, five different virtual machines 1302-1306 are represented by rectangles. These virtual machines execute within a cluster from which a resource pool 1308 is abstracted. Each virtual machine is allocated a number of storage shares indicated within the rectangles representing the virtual machines 1302-1306 in FIG. 13. A total of 3130 storage shares 1310 are thus allocated among the virtual machines. These storage-share allocations represent the priority, importance, or weighting of the virtual machines with respect to use of the data-storage resources of the cluster represented by the storage-pool component 1312 of the resource pool 1308. When multiple virtual machines are competing to allocate data-storage space, each of the virtual machines is provided data-storage space according to a priority or weighting computed as the relative proportion of the storage shares allocated to the virtual machine with respect to the total allocated shares. For example, as shown in FIG. 13, were the five illustrated virtual machines to begin operation in the cluster prior to data-storage allocations to any of the virtual machines, and were the virtual machines to compete, over a period of time, for data-storage allocations, then, ultimately, the relative portions of the total data-storage capacity of a cluster would end up allocated to each virtual machines according to each virtual machine's portion of the total number of allocated shares. Because virtual machine 0 is allocated 600 shares from the total number of shares 3130, virtual machine 0 would end up with (600/3130)×100=19.2% of the total data-storage resource. Because the total data-storage resource is represented as nine virtual disks in FIG. 13, virtual machine 0 would end up with 1.72 virtual disks 1314-1315, as indicated by the shaded portions of the first two virtual disks 1316-1317 labeled "VM 0." In practice, because of the dynamic nature of virtual-machine execution and scheduling as well as the dynamic nature of resource allocations and of the characteristics of a virtual computer system, the amount of data storage allocated, at any given time, to each of the virtual machines does not reflect the relative proportion of the total number of data-storage shares held by the virtual machine. The shares held by a virtual machine reflect the priority with which a virtual machine is granted allocation requests, rather than the total amount of the data-storage resource that ends up allocated to the virtual machine. When a VM fails to allocate a portion of a resource or resource pool corresponding to the shares allocated to the VM, other VMs may allocate additional resources beyond their proportion of allocated shares. Shares of other types of computational resources, including processing bandwidth, memory capacity, and networking bandwidth, are similarly allocated to virtual machines by a management layer within a virtualized computer system.

Figure 14:
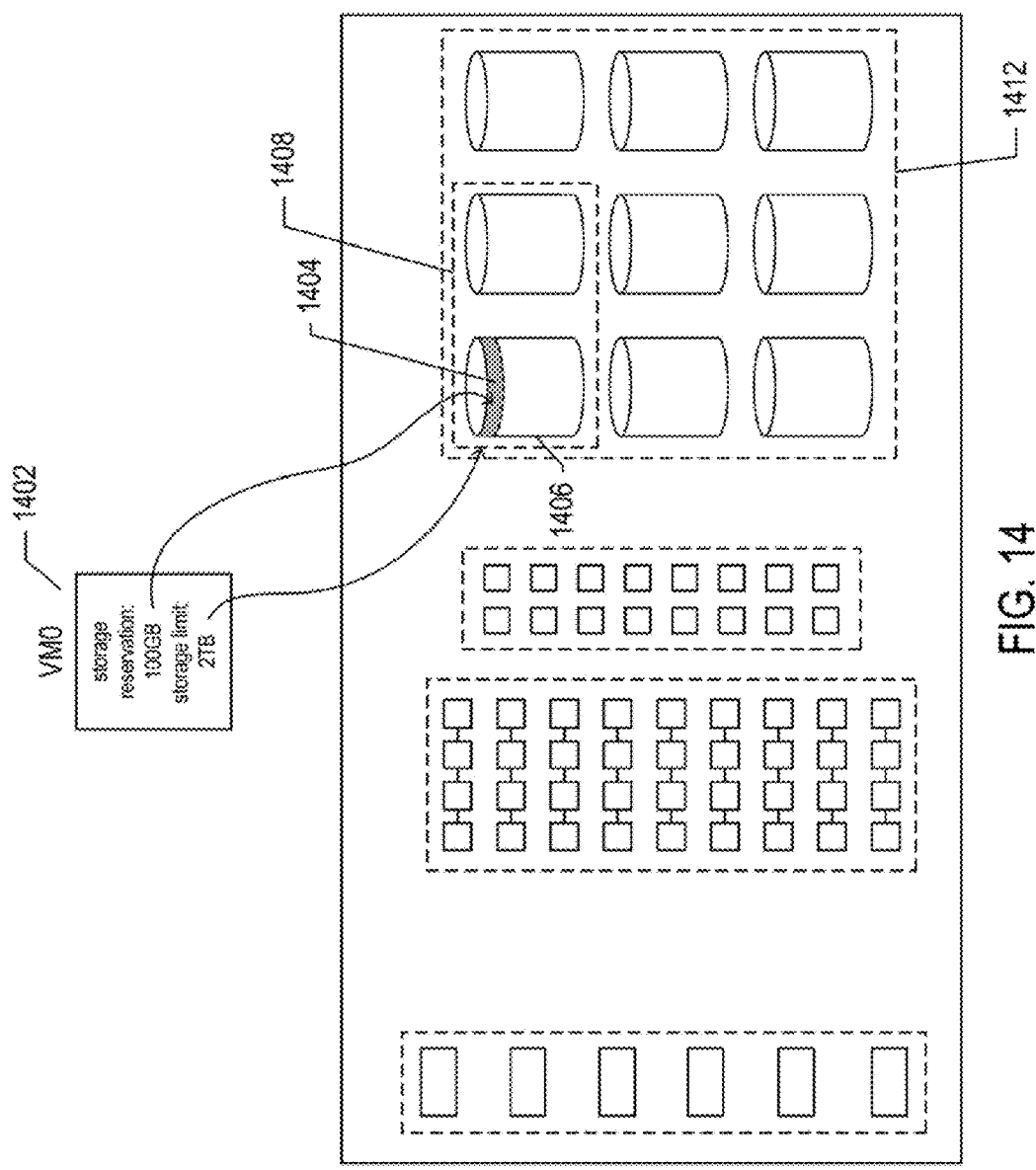

FIG. 14 illustrates the concept of resource reservation and resource limits. In addition to allocating shares to virtual machines, a management server or management layer within a virtualized computer system may also assign to each virtual machine both a capacity or bandwidth reservation and a capacity or bandwidth limit, depending on the type of resource. For example, as shown in FIG. 14, virtual machine 0 1402 has been assigned a data-storage reservation of 100 gigabytes ("GB") and a data-storage limit of 2 terabytes ("TB"). Assuming each of the virtual disks in the data-storage pool 1312 has a total capacity of one terabyte, the data-storage reservation represents a total amount of data storage corresponding to the shaded portion 1404 of the first virtual disk 1406 while the data-storage limit of 2 TB represents the total data-storage capacity of two virtual disks, as represented by dashed rectangle 1408. The data-storage reservation is an indication of the minimum amount of data-storage capacity that needs to be available, in the resource pool, for virtual machine 0 in order to launch execution of virtual machine 0. The data-storage limit represents the total amount of data-storage capacity within the virtualized computer system that can be allocated to virtual machine 0. Each virtual machine can be assigned a reservation and limit, in addition to a number of shares, with respect to each of the various types of resources represented as resource-pool components of the overall resource pool (1308 in FIG. 13).

Figures 15, 16:
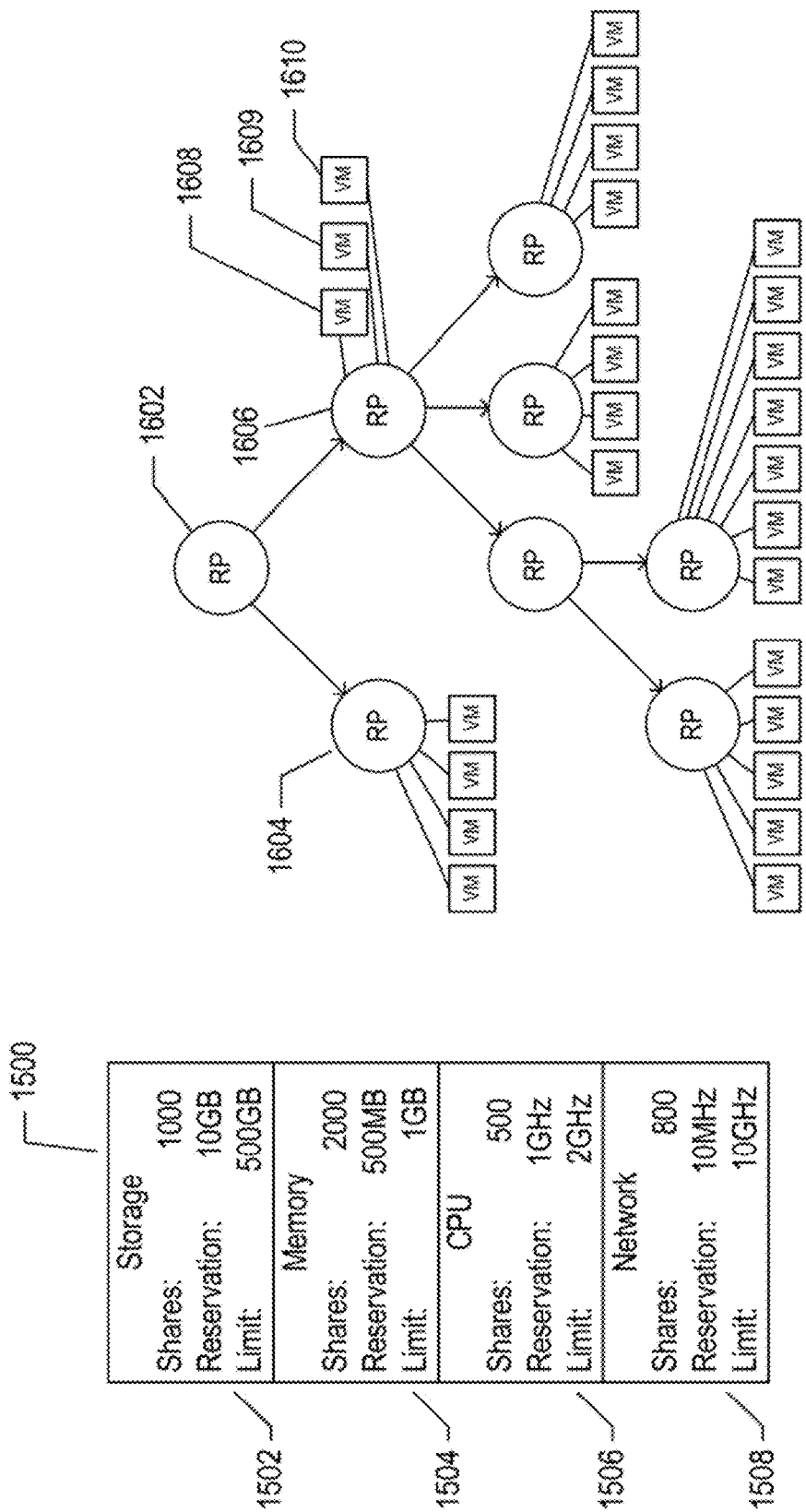

FIG. 15 illustrates a set of resource allocations to a particular virtual machine. These include allocated shares, reservations, and limits for data storage 1502, memory 1504, processing bandwidth 1506, and networking bandwidth 1508. The resource allocations encoded in the data structure 1500 shown in FIG. 15 may be incorporated within, or may be a component of, a description of a virtual machine that is used by a management server or management layer to manage execution of the virtual machine. In the current document, the resource allocations shown in FIG. 15 form a portion of the resource-allocation virtual-machine state.

FIG. 16 illustrates the hierarchical nature of resource pools. The total, aggregated, usable computing resources of a cluster or data center may be represented by a root-node resource pool 1602. Using virtualized-computer-system administrative tools, this root-node resource pool may be hierarchically partitioned into immediate child resource pools 1604 and 1606, each of which may be, in turn, partitioned into additional, lower-level resource pools, with the partitioning continuing to arbitrary, desired level. The child resource pools represent portions of a parent resource pool. During system operation, child resource pools may be allocated additional bandwidth or capacity from the parent resource pool when additional capacity and bandwidth is available. Virtual machines are associated with resource pools. For example, virtual machines 1608-1610 are associated with the second-level resource pool 1606 which is a child of the root-node resource pool 1602. Hierarchical partitioning of resource pools provides system administrators the ability to partition aggregate computing resources in a fine-grained, hierarchical fashion amongst various different classes of virtual machines within the virtualized computer system.

Virtualization-Layer Subsystem to which the Current Document is Directed

Figure 17:
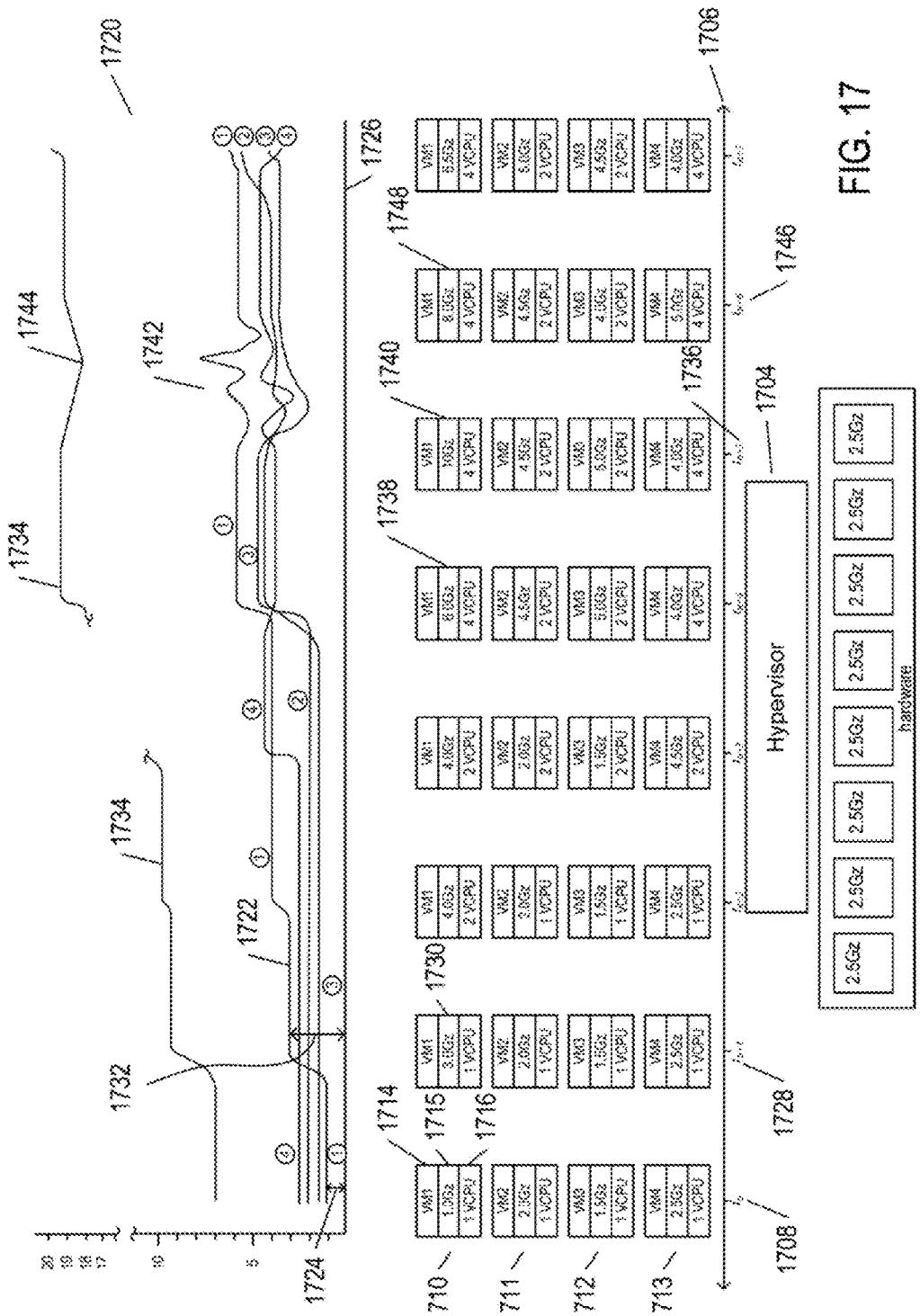
FIG. 17 illustrates a simple example of non-optimal system behavior and unpredictability in the computational throughput of virtual machines running in an execution environment provided by a virtualization layer when the demand for one or more computational resources by the virtual machines approaches or exceeds the computational resources available from the hardware.

FIG. 17 illustrates a simple example of non-optimal system behavior and unpredictability in the computational throughput of virtual machines running in an execution environment provided by a virtualization layer when the demand for one or more computational resources by the virtual machines approaches or exceeds the aggregate computational resources available from the hardware. In this simple example, the only computational resource considered is the instruction-execution bandwidth. The hardware layer 1702 in this example includes eight 2.5 GHz processors. A hypervisor 1704 allocates the instruction-execution computational resource provided by the eight processors to four virtual machines VM1, VM2, VM3, and VM4. The example illustrates a period of time of system behavior indicated by a timeline 1706 that shows eight discrete time points $t_n, t_{n+1}, \ldots, t_{n+7}$. At each time point, a simplified resource-allocation state is shown for each virtual machine. For example, at time point $t_n$ 1708, blocks 1710-1713 represents the resource-allocation states of the four virtual machines at time point $t_n$. Each block includes an indication of the virtual machine 1714, an indication of the current instruction-execution-bandwidth demand made by the virtual machine 1715, and an indication of the number of virtual CPUs allocated to the virtual machine by the hypervisor 1716.

At the top of FIG. 17, the instruction-execution-bandwidth utilized by each of the four virtual machines is plotted, in plot 1720, with respect to time. In this plot, for example, the curve labeled by a circled number "1" 1722 corresponds to the instruction-execution bandwidth currently utilized by the first virtual machine VM1. This curve is explained by considering the demand for instruction-execution bandwidth made by the first virtual machine at each of the discrete time points $t_n$-$t_{n+7}$. For example at the first time point $t_{n+1}$ 1708, the first virtual machine demands 1 GHz of instruction-execution bandwidth. This is reflected in the height 1724 of curve 1722 above the t axis 1726 of plot 1720 at time $t_n$. At time point $t_{n+1}$ 1728, the demand for instruction-execution throughput by the first virtual machine has increased to 3.0 GHz 1730. The height of curve 1722 above the x axis 1732 reflects additional instruction-execution bandwidth allocated to VM1 as a result of VM1's increased demand for instruction-execution bandwidth. A similar analysis explains the shapes of the other three curves corresponding to the other three virtual machines. In plot 1720, the unlabeled, upper curve 1734 represents the total instruction-execution bandwidth utilized by the hypervisor and four virtual machines. These curves are idealized and do not include the variability in the fine-grained instruction-execution-bandwidth utilization that would be observed in an actual system.

The instruction-execution-bandwidth utilization curves are steady and predictable up until time point $t_{n+5}$ 1736, when a large increase in the demand for instruction-execution bandwidth by the virtual machine, seen by comparing the demand at time point $t_{n+4}$ 1738 to the demand at time point $t_{n+5}$ 1740, has resulted in the four virtual machines demanding an aggregate instruction-execution bandwidth that exceeds the available instruction-execution bandwidth provided by the hardware layer 1702. At this point, as can be seen by the erratic behavior of the utilization curves 1742 between time points $t_{n+5}$ and $t_{n+6}$, and by the dip in the total instruction-execution-bandwidth utilization curve 1744 in this same time period, system behavior has become non-optimal and the instruction-execution throughput experienced by the virtual machines is relatively unpredictable. This non-optimal system behavior and unpredictability in the instruction-execution throughput experienced by the virtual machines is resolved when, at time point $t_{n+6}$ 1746, the demand for instruction-execution bandwidth by the first virtual machine is reduced back to 6 GHz 1748. Thus, the non-optimal system behavior and unpredictability in instruction-execution throughput for the virtual machines is precipitated by the increase in demand for instruction-execution bandwidth by the first virtual machine in the time interval $t_{n+4}$-$t_{n+5}$. Non-optimal system performance is undesirable, but even more undesirable are the many system alarms that may be generated due to operational instabilities and sub-optimal performance. These alarms may trigger a variety of computationally expensive responses and may need to be dealt with by human system administrators and other personnel. Incorrect diagnosis of the problem can, in turn, lead to further problems.

Had the hypervisor been able to anticipate the non-optimal system behavior and unpredictable instruction-execution throughput that ensued (1742 and 1744), the hypervisor may have been able to ameliorate the situation and prevent the instability and decrease in overall processor utilization by refusing the increased demand for instruction-execution bandwidth by the first virtual machine or by an alternative VM-execution scheduling that temporarily decreased the instruction-execution bandwidth provided to the other virtual machines in order to temporarily service the increased demand by the first virtual machine. Amelioration of the system instability would have also prevented triggering of system alarms and many potentially expensive downstream affects of the triggering of those alarms.

The example shown in FIG. 17 and discussed above is, as stated, a simple example to illustrate occurrence of non-optimal system behavior and unpredictability in the instruction-execution throughput and why anticipation of such behavior is desirable. In this case, the fact that the demand for instruction-execution bandwidth was approaching the available instruction-execution bandwidth provided by the hardware layer might be detected by relatively straightforward resource-allocation monitoring. However, in many more complicated and less forward cases, the approach of a system to critical points in system operation where non-optimal system behavior is precipitated may not be detectable by simple monitoring techniques. As one example, there are often scenarios in which conflicts between concurrently executing processes can lead to non-optimal system behavior, even though the aggregate demand for system recourses does not approach total resource capacity within the system. For example, particular patterns of memory access by two concurrently executing processes may end up in a high virtual-memory page replacement rate, even though, for most common workloads, the amount of virtual memory being used by the two concurrently executing processes would be more than adequate. Any change in the number of concurrently executing VMs, in the operational and configuration parameters for one or more VM, in the operational and configuration parameters for the system, as a whole, may lead to difficult-toforesee non-optimal system behavior. The number of configuration and parameter states that may lead to such behaviors far exceeds the abilities of system designers to develop specific monitoring and detection mechanisms for recognizing them in order to anticipate non-optimal system behavior.

Figure 18:
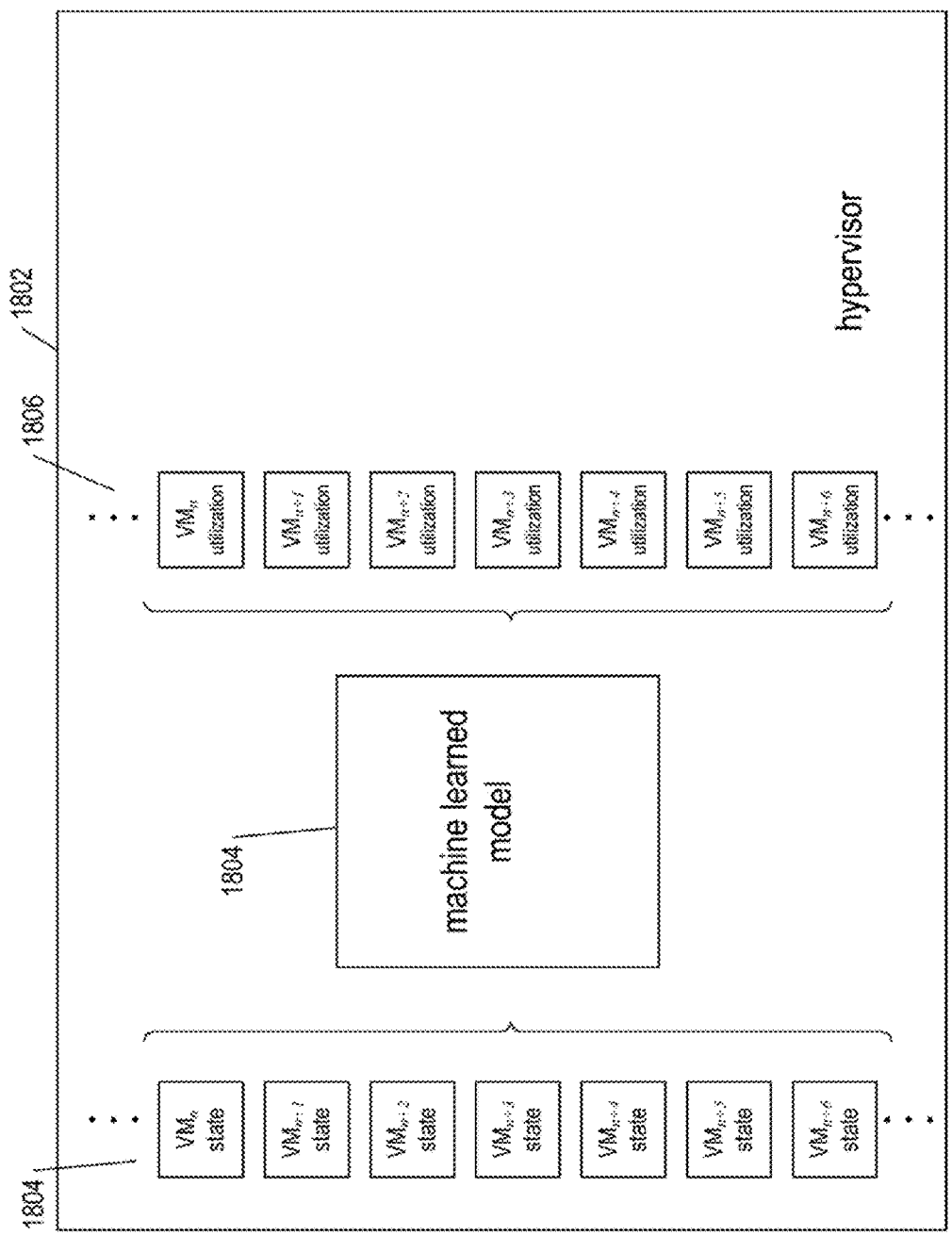
FIG. 18 illustrates the machine-learning-based virtualization-layer subsystem to which the current application is directed.

FIG. 18 illustrates the machine-learning-based virtualization-layer subsystem to which the current application is directed. FIG. 18 is a block diagram in which the largest block represents a hypervisor 1802. The hypervisor includes a machine-learned model 1804 to which a set of virtual-machine state vectors, shown in column 1804, are input and which outputs corresponding virtual-machine utilization vectors shown in column 1806. The machine-learned-model component of the virtualization-layer subsystem to which the current document is directed provides predictions of virtual-machine computational-resource utilizations that are likely to result when VMs executing within a virtualized computer system have the input virtual-machine states. When the virtualization layer receives a request for a change in the allocations of computational resources for a particular VM, the virtualization layer constructs a set of state vectors that represent the VM states that would result were the request to be granted and then inputs the set of VM resource-allocation-state vectors to the machine-learned model 1804. The machine-learned model outputs predicted computational-resource utilizations for each of the VMs 1806 that allow the virtualization layer to determine whether satisfying the original request will result in non-optimal system behavior and/or unpredictability in computational-resource utilization by one or more VMs. When the predicted utilizations indicate non-optimal system behavior or resource-utilization unpredictability, the hypervisor can undertake any of various ameliorative actions in order to prevent non-optimal system behavior and computational-resource-utilization unpredictability (1742 and 1744 in FIG. 17) and the many downstream consequences of these phenomena.

Returning to the example illustrated in FIG. 17, when, in the time period $t_{n+4}$-$t_{n+5}$, the first VM requests an increase in instruction-processing bandwidth from 6 GHz to 10 GHz, the hypervisor constructs, according to the currently disclosed approach, a set of VM resource-allocation-state vectors reflective of the states of the VMs following satisfaction of the request, inputs them to the machine-learned model, and receives the computational-resource utilizations for each of the executing VMs. From these predicted computer-resource utilizations, the hypervisor can determine whether or not the ratio of the demand for one or more computational resources to the utilizations of the one or more computational resources for any of the VMs exceeds a threshold value and, when the ratio is exceeded, attempts to forestall the instabilities and non-optimal behavior that would result were the request to be satisfied without additional action. The request may be denied, in certain cases. In other cases, the hypervisor may be able to shift computational resources from underutilizing VMs to a VM requesting additional computational resources, at least on a temporary basis, in order to satisfy the request without risking the deleterious effects that would obtain without computational-resource shifting. In certain cases, a hypervisor may be able to acquire additional computational resources from remote computer systems, when the hypervisor runs within, and is integrated with, a distributed computer system. In other cases, underutilization of one type of resource may provide an opportunity for satisfying excessive demands for another computational resource. For example, when the instruction-execution bandwidth is underutilized and the demand for memory becomes excessive, the hypervisor may undertake operating-system-like paging in order to provide a larger virtual memory that can satisfy the memory demands by using underutilized instruction-execution bandwidth to carry out the paging operations. The machine-learning-based subsystem provides utilization predictions that allow the hypervisor to anticipate excessive demand-to-utilization ratios for computational resources prior to satisfying requests for the computational resources.

A naïve approach to attempting to solve the problem illustrated in FIG. 17 would be to develop deterministic logic that examines incoming requests to detect requests that, were they to be satisfied, would lead to non-optimal system behavior or unpredictability in computational-resource utilizations. Virtualized computer systems are, however, extremely complicated systems that are not fiasibly modeled analytically. Furthermore, each virtualized computer system is very likely unique, due to the many different types and variations of hardware components and the many different configurations for the hardware, virtualization layer, operating system, and other levels of the many-tiered virtualized computer system. Another naïve approach might be to attempt to build thresholds, limits, and constraints with respect to computational-resource allocation into the hypervisor in order to prevent the hypervisor from satisfying demands for computational resources that would lead to non-optimal behavior, unpredictability, and instability. However, again, virtualized computer systems are extremely complex and their operational characteristics difficult to predict and anticipate. Use of predetermined thresholds, limits, and constraints would likely result in unnecessarily conservative computational-resource allocation and a general less-than-optimal computational throughput. By contrast, the machine-learning-based virtualization-layer subsystem continuously monitors and learns how changes in VM state affect VM computational-resource utilizations for the particular virtualized computer system in which it executes. As a result, the machine-learning-based virtualization-layer subsystem allows a hypervisor to continuously allocate close to the maximum level of allocatable computational resources while being provided advance notice of problems that would ensue were a given request for resources to be satisfied.

Figure 19A:
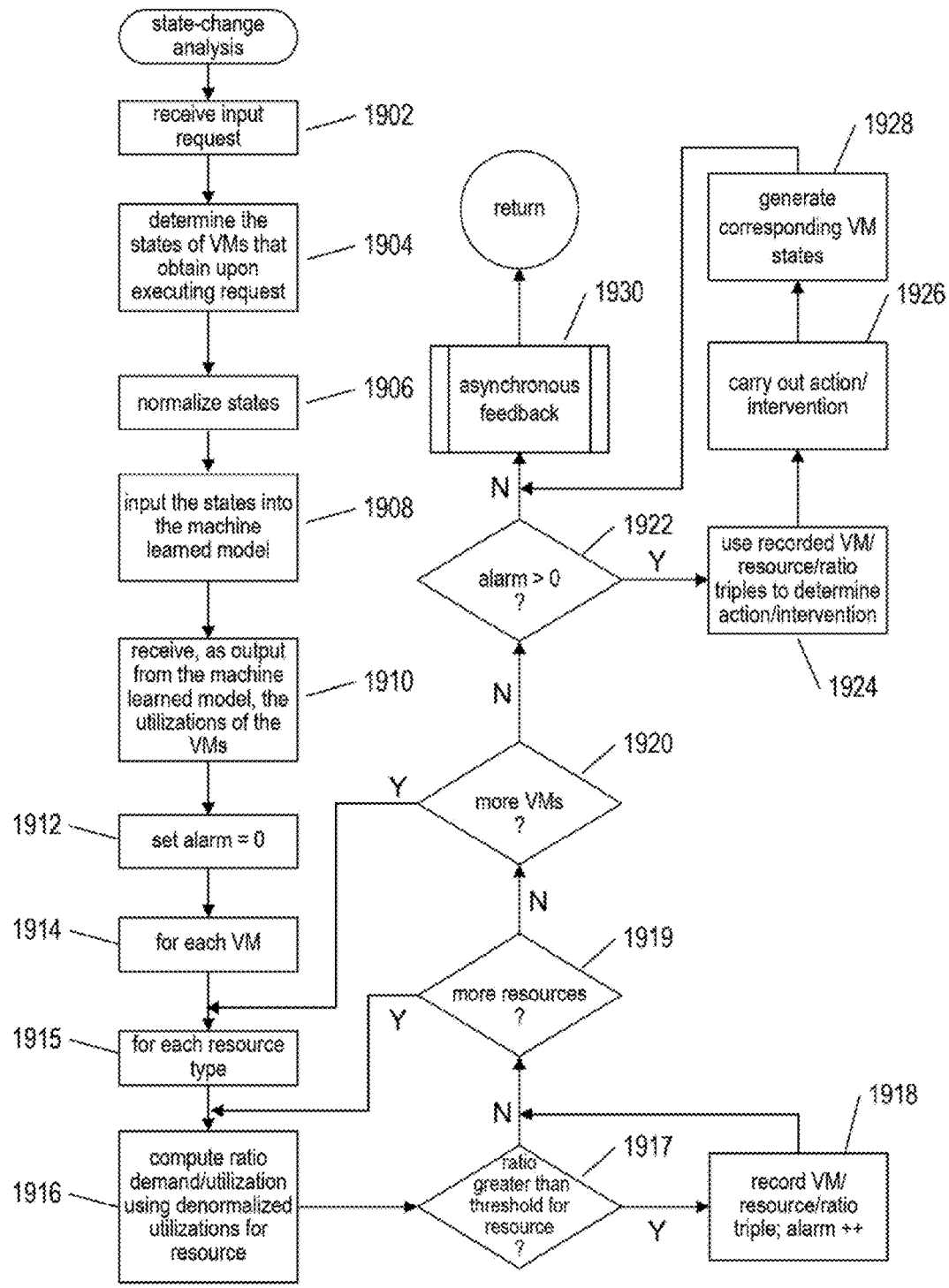
FIGS. 19A-B provide control-flow diagrams to illustrate operation of one implementation of the machine-learning-based virtualization-layer subsystem to which the current document is directed.
Figure 19B:
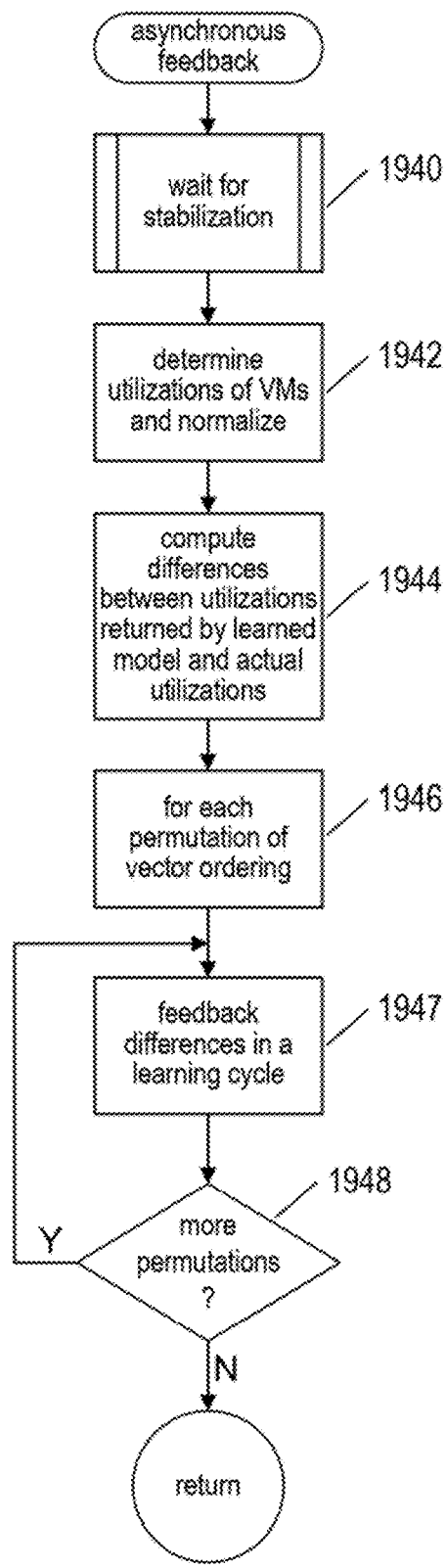

FIGS. 19A-B provide control-flow diagrams to illustrate operation of one implementation of the machine-learning-based virtualization-layer subsystem to which the current document is directed. FIG. 19A provides a control-flow diagram for the routine "state-change analysis," which represents use of the machine-learning-based virtualization-layer subsystem by a resource-allocation component of a hypervisor in order to evaluate requests for computational-resource-allocation changes. In step 1902, the hypervisor receives a request for a change in the resource-allocation state of one or more VMs. For example, a VM may request additional allocation of one or more types of computational resources by changing the reservation, limit, and/or share for the resource. In step 1904, the hypervisor constructs a set of VM resource-allocation-state vectors that reflect what the resource-allocation states of the VMs will be should the received request be satisfied. In step 1904, these state vectors are normalized. The normalization procedure involves expressing the various numeric values within a VM resource-allocation-state vector as percentages of a total available computational resource. For example, a value indicating a reservation of 5 GHz of instruction-execution bandwidth, in the system discussed with reference to FIG. 17, would be normalized to 0.25, since 5 GHz is ¼ of the total instruction-execution bandwidth available from the hardware.

In step 1908, the hypervisor inputs the normalized VM states into the machine-learned model (1804 in FIG. 18) and receives, as output from the machine-learned model, utilization vectors for each VM indicating the predicted normalized utilizations by the VM of each of the various different computational resources, in step 1910. In step 1912, the hypervisor sets a local variable alarm to 0. In the nested for-loops of steps 1914-20, the hypervisor checks the demand/utilization ratio for each computational resource for each VM using the predicted utilizations returned by the machine-learned model in step 1910. When the ratio exceeds a threshold value for a particular computational resource and VM, as determined in step 1917, the hypervisor records an indication of the VM, resource, and demand/utilization ratio and increments the local variable alarm in step 1918. When, following execution of the nested for-loops, local variable alarm stores a value greater than 0, as determined in step 1922, the hypervisor uses the information about the VMs, resources, and demand/utilization ratios recorded in step 1918 to determine what ameliorative steps to take in order to prevent non-optimal system behavior, unpredictabilities, and instabilities, in step 1924, and then carries out the ameliorative steps in step 1926. When the hypervisor, in responding to the request, changes the states of one or more VMs, the hypervisor generates a new set of current VM states in step 1928. When no problems with the input request are detected, or following steps 1924, 1926, and 1928 when problems are detected, the hypervisor calls an asynchronous-feedback routine, in step 1930, to provide feedback to the machine-learned model with regard to the accuracy of the predictions made by the model in step 1910.

FIG. 19B provides a control-flow diagram for the routine "asynchronous feedback," called in step 1930 of FIG. 19A. In step 1940, the routine "asynchronous feedback" waits for the computer system to stabilize following any changes to VM states made as a result of the processing of an input request by the hypervisor in the routine "state-change analysis," illustrated in FIG. 19A. In step 1942, the routine "asynchronous feedback" determines the actual utilizations of the various different types of computational resources by each of the VMs and normalizes these utilizations. In step 1944, the routine "asynchronous feedback" computes differences between the actual normalized utilizations determined in step 1942 and the normalized utilizations predicted in step 1910 of FIG. 19A by the machine-learned model. Then, in the for-loop of steps 1946-1948, these computed differences are fed back to the machine-learned model, with each iteration of the for-loop feeding back the differences using different permutations of the orders of the VM resource-allocation-state vectors in the input VM states and corresponding permutations in the orders of the output utilization vectors. For example, in the case that two VMs are executing, in a first iteration of the for-loop of steps 1946-1948, resource-allocation-state vectors would be input in the order VM1, VM2, and the observed utilization vectors would be input in the order U1, U2. In a second iteration, the VM resource-allocation-state vectors would be input in the order V2, V1 and the observed utilizations would be input in the utilization vectors in the order U2, U1.

Figure 20A:
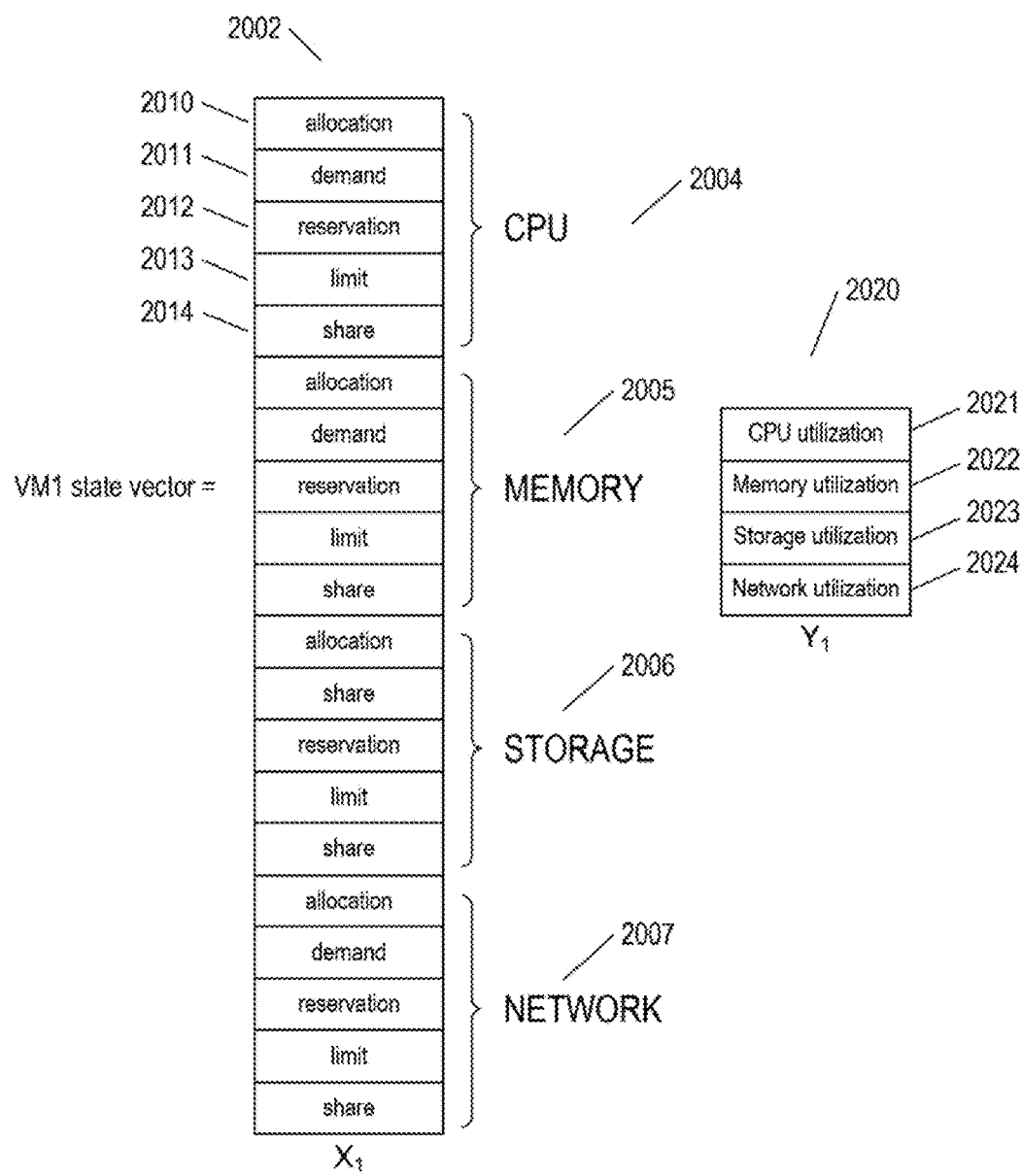
FIGS. 20A-B illustrate the inputs and outputs to the machine-learned model within the virtualization-layer subsystem to which the current document is directed.
Figure 20B:
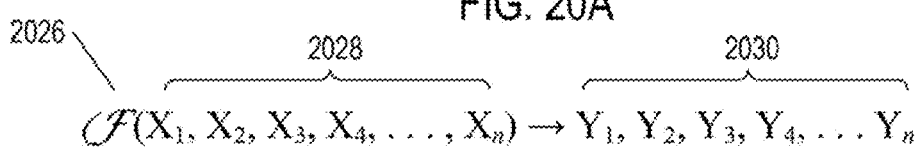

FIGS. 20A-B illustrate the inputs and outputs to the machine-learned model within the virtualization-layer subsystem to which the current document is directed. In one implementations, the VM resource-allocation-state vector 2002 includes four sub-state vectors 2004-2007 corresponding to the CPU, memory, storage, and network computational resources. Each sub-state vector includes five elements: (1) an indication 2010 of the portion of the computational resource currently allocated to the VM; (2) an indication 2011 of the portion of the computational resource that is currently demanded by the VM; (3) an indication 2012 of the current reservation for the VM for the computational resource; (4) an indication 2013 of the current limit for the computational resource for the VM; and (5) an indication 2014 of the current share for the computational resource for the VM. As discussed above, in certain implementations, these values are normalized to percentages of the total available computational resource for input to the machine-learned model. Output from the machine-learned model for a particular VM is a utilization vector 2020 that includes normalized utilization values for each of the four computational resources: CPU 2021, memory 2022, storage 2023, and network 2024. The machine-learned model (1804 in FIG. 18) can be abstractly represented as carrying out evaluation of a function $\Phi$ 2026 that takes, as inputs, n VM resource-allocation-state vectors 2028 and returns, as output, n corresponding utilization vectors 2030.

Figure 21:
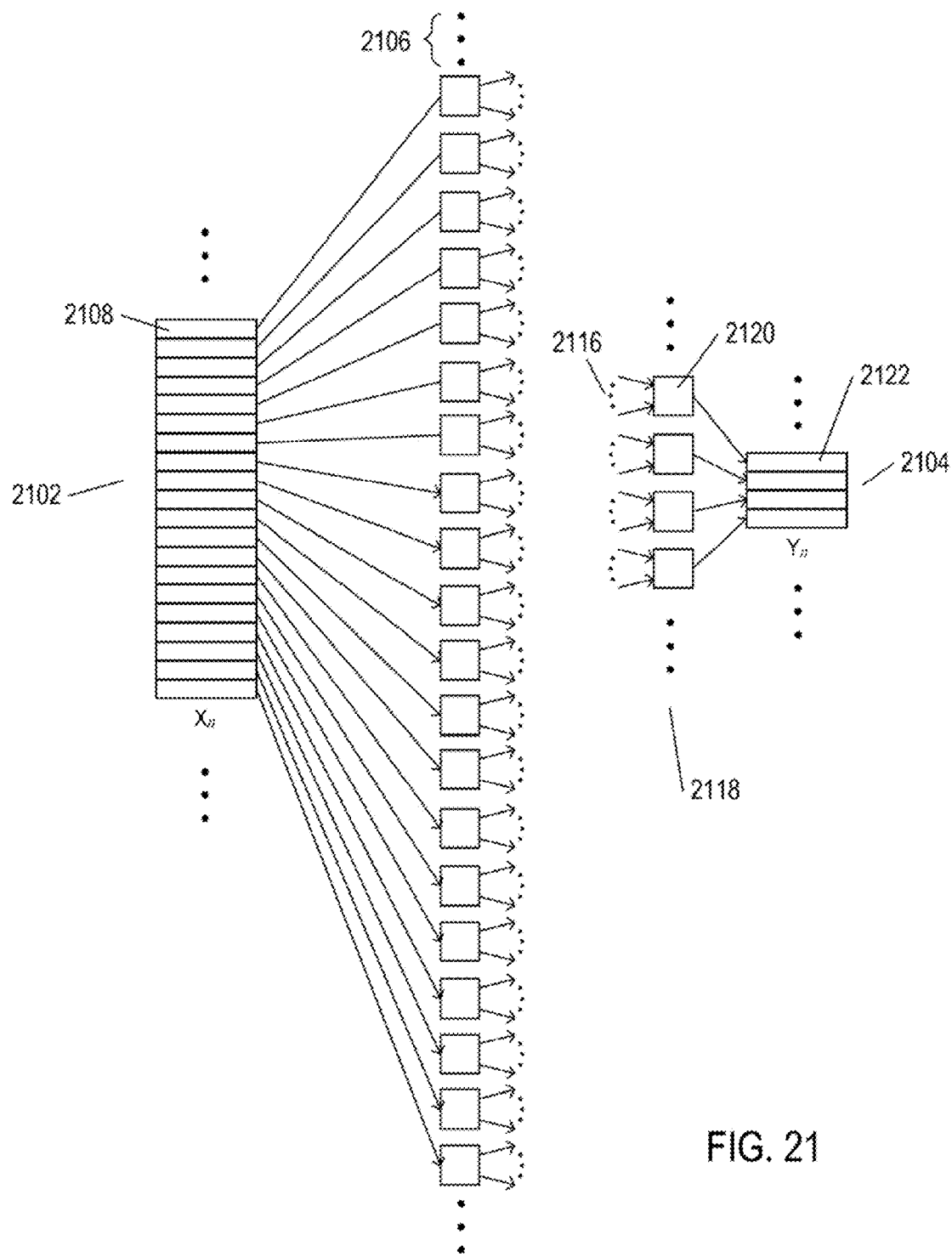
FIG. 21 illustrates general characteristics of a neural-network implementation of the machine-learned model included within a virtualization layer.

There are many different types of machine-learning systems that may be incorporated within a virtualization layer to provide computer-resource-utilization predictions. In one implementation, a neural network is employed to learn the characteristics of the virtualized computer system in which the neural network is included as a subsystem and to provide predictions of computer-resource utilizations based on input VM resource-allocation-state vectors. FIG. 21 illustrates general characteristics of a neural-network implementation of the machine-learned model included within a virtualization layer. As discussed above, input to the neural network comprises a set of VM resource-allocation-state vectors, such as VM resource-allocation-state vector 2102. For each input VM resource-allocation-state vector, a corresponding computation-resource-utilization vector 2104 is output. In one implementation, a set of VM resource-allocation-state vectors is concatenated together to form a single input vector that is input to the neural network, which outputs a single computational-resource-utilization vector that includes computational-resource-utilization subvectors for each VM. Thus, the ellipses in FIG. 21, such as ellipsis 2106, indicate that only a portion of the inputs, outputs, and internal structures of the neural network are shown. In one implementation, each element in each VM resource-allocation-state vector input to the neural network is submitted to a different neural-network input-level node. For example, the first element 2108 in VM resource-allocation-state vector 2102 is input to neural-network input-level node 2110. The layer of neural-network nodes, represented by column 2112 in FIG. 21, to which elements of VM resource-allocation-state vectors are input, form a first layer or first level of neural-network nodes within the neural network. A neural network may have an arbitrary number of neural-network-node levels and an arbitrary pattern of inter-node links, as indicated in FIG. 21 by the sets of ellipses between the input-level and output-level nodes, such as sets of ellipses 2114 and 2116. The neural network has a final set of neural-network nodes, represented in FIG. 21 by column 2118, that each outputs a value to a single element of an output computational-resource-utilization vector. For example, the output-level node 2120 outputs element 2122 of computational-resource-utilization vector 2104.

In an implementation subsequently described with reference to FIGS. 24A-J, n VM resource-allocation-state vectors are concatenated together to form a single input vector to the neural network, each element of which is directed to each input-level node within the neural network. The neural network produces a final output vector comprising n corresponding computational-resource-utilization vectors. In the neural network instantiated in the example, the neural network includes two layers of neural-network nodes. The nodes of the input layer each receive, as inputs, the elements of the input vector. The nodes of the output layer each receive outputs from the nodes of the input layer and each produces an output that corresponds to one element of the output vector. However, the implementation can be configured to have an arbitrary number of layers with arbitrary linkages between nodes and input and output vector elements. In the described implementation, in order to accommodate a varying number of executing VMs within the execution environment provided by the virtualization layer, a very large number n of VM resource-allocation-state vectors are concatenated together to produce a very large input vector for the neural network. In general, only a portion of the subvectors within the input vector correspond to executing VMs. The remaining subvectors have zero-valued elements. In alternative implementations, a variety of neural-network instantiations with different numbers of input-level and output-level nodes are maintained within the virtualization-layer subsystem so that there is a separate learned model for each different number of executing VMs or for each different small range of numbers of executing VMs, to provide greater precision of prediction based on the number of VMs currently executing in the execution environment provided by the virtualization layer. In yet alternative implementations, connectivity between the input and output vectors and the neural-network nodes may be changed to accommodate different input/output vector sizes.

Figure 22:
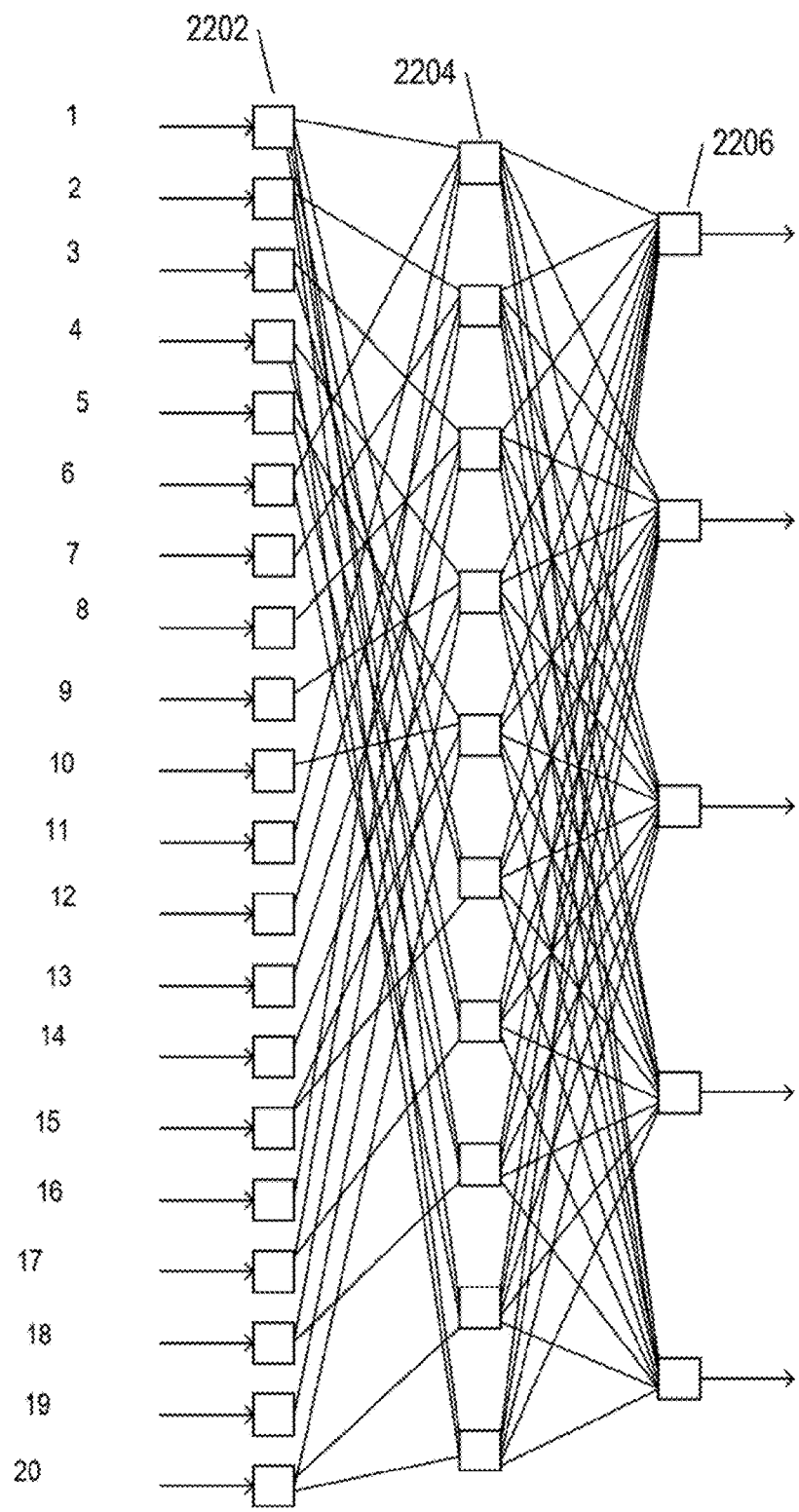
FIG. 22 illustrates one particular neural network.

FIG. 22 illustrates one particular neural network. In this particular instance of a neural network, there is a first input layer of neural-network nodes 2202, a second internal layer of neural-network nodes 2204, and a final layer of output neural-network nodes 2206. As with the generic implementation shown in FIG. 21, each of the input nodes in column 2202 receives a single input value and each of the output nodes, in column 2206, outputs a single output value. However, each input node may be connected to all or a portion of the nodes in the internal layer 2204 of nodes and each node in the output layer 2206 may receive inputs from all or a portion of the internal-layer nodes 2204. In certain implementations of neural networks, the pattern of links between neural-network nodes may change, over time, as the neural network learns the function Φ that maps the input values to output values. In other implementations, the pattern of links is fixed, but the weights associated with each link, discussed below, change, over time, as the neural network learns the function Φ through training.

Figure 23:
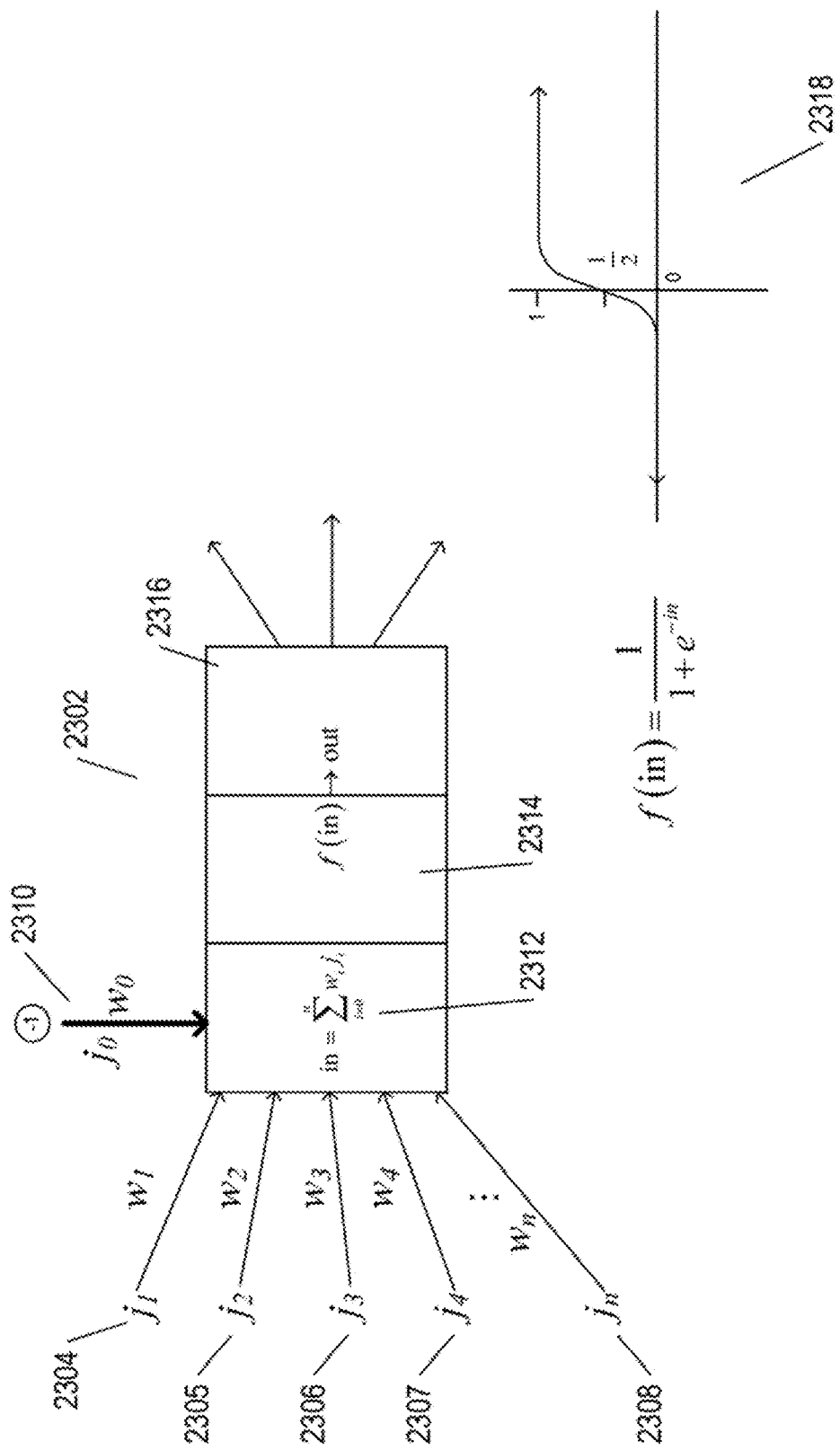
FIG. 23 illustrates a node within a neural network.

FIG. 23 illustrates a node within a neural network. The node 2302 receives n inputs $j_1$-$j_n$ 2304-2308 from n nodes of a preceding layer or from n elements of the input vector. In certain cases, the node has a single external input, while, in other cases, n can be a relatively large number. The node also has an internal input 2310, $j_0$, that has a fixed input value of −1. The internal input $j_0$ and the external inputs $j_1$-$j_n$ are each associated with a corresponding weight $W_0$-$W_n$, as indicated in FIG. 23. The node operates by collecting all of the inputs and summing the product of the weight associated with the input link and the input value to produce an aggregate input value in 2312. Then, the node applies a sigmoidal function $f$ to the aggregate input, $f(in)$ 2314, to produce an output value out 2316. This output value is then output to whatever next-level nodes the neural node is linked to. In certain implementations, an output-level neural-network node has only a single output link, or forward link. In one implementation, the sigmoidal function is expressed as:

$$f(in) = \frac{1}{1 + e^{-ln}}.$$

A plot 2318 of this function is shown in FIG. 23.

In a learning process, differences are computed between the predicted utilization values and the actual observed utilization values, following system stabilization, and those differences are fed back into the neural network from output-level nodes to input-level nodes, in reverse order from generation of output vectors from input vectors by the neural network. During the feedback process, the weights associated with input links $W_0$-$W_n$ are modified proportionally to the computed differences between the observed utilizations and predicted utilizations in order to adjust the function Φ computed by the neural network. As mentioned above, in certain implementations, the pattern of linkages between neural-network nodes and the number of node levels may also be altered in order to adjust the function Φ computed by the neural network.

FIGS. 24A-J provide a simple C++ implementation of a neural network. Only simple language features are employed in order to clearly illustrate, in the example of FIGS. 24A-J, basic operation of a two-layer neural network that can be used to implement a function Φ that receives, as input, a large vector formed by concatenating together a number of VM resource-allocation status vectors and that produces, as output, an output vector formed by concatenating together the same number of computation-resource-utilization vectors, as discussed above with reference to FIGS. 20A-22. Operation of the neural network is well explained by only three functions, implementations of which are provided on FIGS. 24E-F.

FIG. 24A shows a portion of the header file for the implementation. Several libraries are included by the include statements 2402. A number of constants are then declared 2403, including the constant MAX_LEVELS, which specifies a maximum number of node levels that can be employed in the neural network, MAX_INPUTS, which indicates the maximum number of elements in the input vector, and MAX_OUTPUTS, which indicates the maximum number of outputs or elements in the output vector. Of course, these constants can be declared with larger values, as needed. They are used to define various arrays, rather than dynamically allocate space, in certain cases. A final constant alpha represents a learning rate for the neural network. This constant defines the magnitude of the affect of a learning pass on the weights within nodes of the neural network. Next, two type definitions for pointers to integers and to floating-point numbers are declared 2404.

A first class declaration 2405 is provided for the class configuration. An instance of this class defines the neural network that is created and configured to implement the function Φ. The configuration for a neural network is specified by a number of parameters input to a constructor 2406 for the class. These include: (1) numIV, the number of input VM resource-allocation status vectors; (2) iVSize, the size of each VM resource-allocation status vector, (3) numOV, the number of output computational-resource-utilization vectors; (4) oVSize, the size of each computational-resource-utilization vector, (5) map, a formatted character string that lays out the linkage pattern of the neutral net, including inputs to each input node, outputs from each node to nodes of successive layers, and outputs of output nodes to elements of the computational-resource-utilization-vector elements. FIG. 24J illustrates creation of a map for an example neural network within a main routine. The inputs for each node are listed, in order, in substrings separated by the value −1. The descriptions of nodes for each layer of nodes are separated by the value −2. Of course, there are many ways for specifying the size and configuration of a neural network.

An instance of the class configuration parses the configuration map to produce an accessible configuration description that can be used by subsequently discussed class instances to implement a neural network. An instance of the class configuration includes private data members 2407 that store the number of input VM resource-allocation status vectors 2408, the VM status-vector size 2409, the number of computational-resource-utilization output vectors 2410, the size of each output vector 2411, the number of node levels in the neural network 2412, the number of nodes in each level of the neural network 2413, offsets to a description of the nodes in the map for each level 2414, and a pointer to the configuration map 2415. The member functions 2416 provide information about the configuration of the neural network. A pair of member functions 2417 provide, by successive calls, the inputs for each node at each level of the neural network. The number of inputs for a given node of a given level is returned by the function getNumInputs 2418. The number of forward pointers emanating from a given node of a given level is returned by the function getNumberOfForwardPointersFrom 2419.

FIG. 24B shows more of the header file for the implementation which includes the declaration of a class node 2420, each instance of which represents a neural-network node. The data members of the class node 2421 include: (1) sum, the sum of the weighted inputs to the node 2422; (2) deltaSum, the sum of feedback from linked nodes of a next level 2423; (3) output, the output value generated by the node 2424; (4) numInput, the number of inputs already received and processed by the node 2425; (5) numFedBack, the number of feedback values from nodes of a next level received and processed by the node 2426; (6) numInputs, the number of input links to the node from external nodes or input-vector elements 2427; (7) weights, a pointer to an array of weights associated, in order, with the inputs to the node 2428; (8) forwardLinks, a pointer to an array containing pointers to nodes of a next layer to which the node is linked 2429; (9) numForwadLinks, the number of forward links from the current node to nodes of a next layer 2430; (10) backwardLinks, a pointer to an array containing pointers to nodes of a preceding level to which the current node is linked 2431; (11) numBackwardLInks, the number of backward links in the current node to nodes of a preceding level 2432; (12) inputs, a pointer to an array of floating-point values representing the input values to the node 2433; (13) $f$, a pointer to the sigmoidal function used to computer the output value for the node 2434; and (14) fDev, a pointer to the derivative of the sigmoidal function 2435, used for computing adjustments to the weights during the feedback-mediated learning process. Most of the member functions 2436 for the class node are used to get and set values for the data members. Neural network operation is largely implemented by three member functions 2437 that include: (1) two forms of the function addInput called by a node of a previous level or by an input process to transmit an input value to the node; and (2) addFeedback, called by a node of a next level or by a learning-process routine to provide feedback to the node during the learning process.

FIG. 24C includes the final portion of the header file that contains a declaration of the class model 2440. An instance of the class model represents a machine-learned model that can be included within a virtualization-layer subsystem to which the current document is directed. The data members contained in an instance of the class model 2441 include: (1) level 2442, an array of pointers to arrays of nodes for each level of the neural network; (2) $f$ 2443, a pointer to the sigmoidal node function; (3) fDev 2444, a pointer to the derivative of the sigmoidal function; and (4) config 2445, a pointer to an instance of the class configuration that specifies the configuration for the neural network. The member function clearNodes 2446 calls the member function clear of each node in the neural network to prepare the neural network for a next input vector or for a learning cycle. The member function generateOutputVectors 2447 inputs an input vector to the neural network, which produces the resulting output vectors. The member function learn 2448 of the class model inputs an input vector and a vector actualVectors that represents actual observed values that can be used to train the neural network by adjusting weights so that the output vectors produced by the neural network more closely correspond to the values in the vector actualVectors. Note that the input vectors and output vectors are assumed to be concatenated together into a single input vector and a single output vector. Finally, a constructor 2449 for the class model creates a neural network specified by an input instance of the class configuration as well as pointers to the sigmoidal function and the derivative of the sigmoidal function used in the neural-network nodes.

FIG. 24C also includes implementations of a number of member functions of the class configuration, with the remaining member functions of the class configuration shown in FIG. 24D. The function member getNumberOfForwardPointersFrom 2450 looks at the configuration for the next level in the configuration map and counts the number of nodes which receive input from the node for which the number of forward pointers is returned by the member function getNumberOfForwardPointersFrom. The member function getFirstInput 2451 consults the configuration map to determine the first input for the node specified by the level and nodeNum arguments and sets an internal index to a next input specifier in the map. Each call to the member function getNextInput 2452 returns a next input for the node specified by the arguments to the member function getFirstInput, returning a value −1 when there are no more inputs. The member function getNumInputs 2453 returns an indication of the number of inputs for a specified node. The constructor 2454 parses the configuration map input as argument m in order to instantiate an instance of the class configuration.

FIG. 24E shows the implementations of the two versions of the member function addInput for the class node. The first version 2455 is called by the member function generateOutputVectors of the class model when inputting an input vector to the neural network. The second version 2456 is called by a node of a preceding level of the neural network. These two functions essentially implement neural-network generation of output values from an input vector. The two functions differ in that the second argument to the first version 2455 is an integer that specifies the index of an input-vector element while, in the second version 2456, the second argument is a pointer to the node that is calling the addInput member function to input a value to the node. Because the two versions are quite similar, only the second version is described below. First, the member function numInput is incremented 2457 and the input value furnished as an argument to the member function addInput is entered into the array of input values inputs 2458. When the number of received input values is equal to the total number of inputs to the node, as determined by the conditional portion of the if statement 2459, the sum of the inputs multiplied by corresponding weights is computed and the sigmoidal function is called on the sum to produce the output value 2460, as described above with reference to FIG.

23. Then, in a final for-loop 2461, the output is transmitted to the nodes linked to the current node in the next neural-network level.

FIG. 24F shows the member function addFeedback of the class node. This function largely implements the learning process of the neural network. It is called either by the member function learn of the class model or by a node of the next level of the neural network linked to the current node. The argument provided to the member function addFeedback is a delta value computed from the difference between an element of an output vector and a corresponding element of a vector of actual observed values. First, the feedback value is added to the data member deltaSum 2463. The data member numFedBack is then incremented 2464. When the current node is in the last layer of the neural network or when the number of feedback values received by the current node is equal to the number of forward links in the current node to nodes of a next layer, as determined in the conditional portion of the if statement 2465, a feedback value is computed 2466 as the value of the derivative of the sigmoidal function supplied with the sum of the weighted inputs times the sum of the received feedback values. In for-loop 2467, the computed feedback value is input to nodes of a preceding level of the neural network linked to the current node. Then, in fir-loop 2468, the weights associated with inputs to the current node are adjusted by the product of the learning rate alpha, the input value, and the computed feedback. Finally, the weight for the internal input with constant input value −1 is adjusted 2469. The weight adjustment is based on a gradient of the squared error, a common approach to seeking an optimum. FIG. 24F also includes an implementation of the member function clearNodes of the class model 2470.

FIGS. 24G-H include portions of the constructor for the class model. It is this function that constructs all of the nodes and links between the nodes of the neural network. In a first for-loop 2471, all of the neural-network nodes of all of the neural-network levels are created. In a next for-loop 2472, nodes of all of the neural-network levels other than the last level are supplied with dynamically allocated arrays for storing forward links. In a next for-loop 2473, all of the nodes in the last level of the neural network are configured to have no forward links. In a next for-loop 2474, all of the neural-network nodes are provided with dynamically allocated arrays of initial weights, are initialized with respect to the number of inputs, and are provided dynamically allocated arrays for backward links to nodes in a preceding level, when the nodes are not in the first level of the neural network. In a final for-loop 2475 which extends to FIG. 2411 all of the links between neural-network nodes are established.

FIG. 24H also shows an implementation of the member function generateOutputVectors for the class model 2476. This function is called in order to generate, from the neural network, a set of output vectors from a set of input vectors. In essence, this represents a call to the function 4D. In a first for-loop 2477, the function extracts values from the elements of the input vector and inputs these extracted values to each successive input-level neural-network node. Once this loop has completed, the neural-network nodes have all been triggered to produce outputs to next-level nodes and have thus computed the output vectors. In a next for-loop 2478, the output values are extracted from the output-level nodes of the neural network and placed into the output vectors.

FIG. 24I shows an implementation of the member function learn of the class model 2480. This function carries out a learning cycle to train the neural network. The function receives an input vector and the vector actualVectors which contains observed values which the neural network should predict. The function learn calls the member function generateOutputVectors 2481 to generate predicted output vectors based on the input vectors from the neural network. Then, in for-loop 2482, the member function learn computes the difference between each observed value and predicted value and feeds this difference back to the corresponding output-level neural-network node. When this for-loop completes, all of the neural network nodes have received feedback and have accordingly adjusted the weights which they use to weight input values. FIG. 24I also shows implementations of the sigmoidal node function 2483 and the derivative of the sigmoidal node function 2484.

FIG. 24J illustrates generation of a simple neural network and use of the neural network. Example input, output, and actual vectors are declared on lines 2486. An array that holds the configuration map is declared on line 2487. A configuration map is programmatically generated on lines 2488. Instances of the classes configuration and model are declared on lines 2489-2490. A call to the member function generateOutputVectors of the class model 2491 illustrates generation of predicted output vectors based on an input vector and a call to the member function learn of the class model 2492 illustrates a learning cycle.

There are, of course, many different possible ways to implement a neural network that is suitable for use as a machine-learned model in a virtualization-layer subsystem to which the current document is directed. The above-described implementation is provided to simply illustrate how a neural network is constructed and how neural-network nodes operate. More concise implementations can be obtained by using more complex language features, including class inheritance, iterators, virtual functions, and templates. The above-described implementation omits destructors, error detection and handling, and the many other functionalities that would be included in a commercial implementation.

While neural networks represents one type of machine-learning technology, there are other types of machine-learning technologies that can be used to implement a computational-resource-utilization-prediction function $\Phi$ for use in a virtualization-layer subsystem. As discussed above, a machine-learning-based model is used because deterministic-logic-based methods are impractical, due to the complexity and uniqueness of virtualized computer systems and analytically derived attempts to include thresholds, limits, and constraints in the virtualization layer to prevent non-optimal system behaviors, unpredictabilities, and instabilities would generally need to be far too conservative to provide for optimal or near-optimal virtualized-computer-system operation. In fact, it is likely to be as infeasible to design such constraints and limits into a virtualization layer as it would be to devise deterministic logic to predict when such non-optimal behavior, unpredictabilities, and instabilities might occur during virtualization-layer optimization. Furthermore, a machine-learning-based subsystem can continuously monitor and change the function $\Phi$ as the virtualized computer system changes dues to hardware additions and deletions, reconfiguration, and other changes in the computational environment of the virtualized computer system.

Although the present invention has been described in terms of particular embodiments, it is not intended that the invention be limited to these embodiments. Modifications within the spirit of the invention will be apparent to those skilled in the art. For example, as discussed above, a virtualization-layer subsystem that predicts computational-resource utilizations for VMs executing within the execution environment provided by the virtualization layer can employ any of many different machine-learning-based prediction subsystems, for each of which there are many alternative implementations that can be obtained by varying any of many different design and implementation parameters, including programming language, operating system, modular organization, data structures, control structures, and other such design and implementation parameters. Virtual-machine resource-allocation states can be expressed by many different types of input vectors with subvectors describing various different types of computational resources. In certain cases, only one or a utilizations are predicted for one or a few different types of computational resources, while in other implementations, the number of predicted utilizations may be greater. While computational-resource utilizations provide a basis for determining potential onset of non-optimal system behavior, unpredictabilities, and instabilities, other predicted values related to operational characteristics of a virtualized computer system may alternatively be used in alternate implementations of the virtualized-layer subsystem. In the implementation discussed in FIGS. 19A-B, the hypervisor continuously trains the machine-learned model. In alternative implementations, the virtualization layer may collect pairs of input vectors and observed utilizations, over time, and carry out discrete learning sessions based on the collected data. In the neural-network implementation discussed above with reference to FIGS. 24A-J, the neural-network nodes are initially configured with small, arbitrary, weights. Alternatively, the neural network employed within the virtualization layer may be initially configured with a set of reasonable weights derived for similarly deployed virtualization layers based on past observations.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A virtualization layer that is executed on one or more processors of a computer system that additionally includes memory data-storage devices, and networking components and that creates a execution environment for a number of virtual machines, the virtualization layer including:
    a machine-learned model that predicts operational characteristics of the computer system from input resource-allocation-state vectors that each describes the resource-allocation state of a different virtual machine; and
    a resource-allocation component that allocates computational resources to virtual machines, the resource-allocation component processing a request that entails changing the resource-allocation state of a virtual machine by,
        generating a set of resource-allocation-state vectors that describe the resource-allocation states of the number of virtual machines in memory,
        inputting the generated set of resource-allocation-state vectors to the machine-learned model,
        receiving, from the machine-learned model, predicted operational characteristics of the computer system for the number of virtual machines with resource allocation states described by the generated set of resource-allocation-state vectors, and
        when the predicted operational characteristics indicate operational non-optimality, unpredictability, and/or instability,
        modifying processing of the request to prevent the predicted operational non-optimality, unpredictability, add/or instability,
    wherein the operational characteristics predicted by the machine-learned model include utilizations for each of one or more computational resources by each of the number of virtual machines.

2. The virtualization layer of claim 1 wherein the predicted operational characteristics indicate operational non-optimality, unpredictability, and/or instability when the ratio of the demand for computational resource to the predicted utilization of the resource exceeds a threshold value for a virtual machine.

3. The virtualization layer of claim 1 wherein each resource-allocation-state vector includes a sub-resource-allocation-state vector for each of a number of computational resources.

4. The virtualization layer of claim 3 wherein each sub-resource-allocation-state vector for a computational resource used by a virtual machine includes:
    an indication of a portion of the computational resource currently allocated to the virtual machine;
    an indication of the portion of the computational resource that is currently demanded by the virtual machine;
    an indication of the current reservation for the virtual machine for the computational resource;
    an indication of the current limit for the computational resource for the virtual machine; and
    an indication of the current share for the computational resource for the virtual machine.

5. The virtualization layer of claim 4 wherein the number of computational resources includes:
    an instruction-execution resource;
    a memory resource;
    a data-storage resource; and
    a network resource.

6. The virtualization layer of claim 1 wherein the machine-learned model is a neural network.

7. The virtualization layer of claim 6 wherein the neural network includes a first input layer of neural-network nodes and a second output layer neural-network nodes, the number of input-layer neural-network nodes greater than the number of output-layer neural-network nodes.

8. The virtualization layer of claim 7 wherein the neural network further includes one or more layers of internal neural-network nodes, each internal neural-network node receiving one or more inputs from one or more input-layer neural-network nodes and/or internal neural-network nodes and each internal neural-network node transmitting one or more outputs to one or more output-layer neural-network nodes and/or internal neural-network nodes.

9. The virtualization layer of claim 8
    wherein each input-layer neural-network node receives an input from one or more elements of an input vector comprising a number of resource-allocation-state vectors concatenated together and outputs an output value to one or more neural-network nodes; and
    wherein each output-layer neural-network node receives an input from one or more neural-network nodes and outputs an output value to an element of an output vector.

10. The virtualization layer of claim 8 wherein the output vector includes a number of utilization vectors concatenated together, the number of utilization vectors equal to the number of resource-allocation-state vectors concatenated together to generate the input vector, each utilization vector including a utilization value for each of a number of computational resources.

11. The virtualization layer of claim 8 where each neural-network node, during generation of an output vector from an input vector, computes a sum of a number of weighted input values and applies a non-linear function to the sum to produce an output value that is output to one or more neural-network nodes and output vectors.

12. The virtualization layer of claim 8 wherein, during a learning cycle, each neural-network node computes a feedback value from one or more feedback values input to the neural network node, outputs the computed feedback value to any neural-network nodes from which the neural-network node receives input values, and adjusts weights that the neural-network node uses to compute a weighted sum of input values according to a an adjustment value computed from one or more feedback values.

13. The virtualization layer of claim 1 wherein the virtualization layer computes feedback values from differences computed between the operational characteristics of the computer system predicted by the machine-learned model for a particular set of virtual-machine resource-allocation states and the operational characteristics of the computer system observed by the virtualization layer for the computer system and uses the computed feedback values to train the machine-learned model.

14. The virtualization layer of claim 13 wherein the virtualization layer computes feedback values and uses the computed feedback values to train the machine-learned model by one or more of:
 continuously computing feedback values and using the continuously computed feedback values to continuously train the machine-learned model;
 continuously computing feedback values, storing the computed feedback values, and intermittently using the stored feedback values to train the machine-learned model; and
 intermittently computing feedback values, storing the computed feedback values, and periodically using the stored feedback values to train the machine-learned model.

15. A method carried out by a virtualization layer, for allocating computational resources to a virtual machine that executes in all execution environment provided by the virtualization layer within a computer system that includes one or more processors, memory, data-storage devices, and networking components, the method comprising:
 providing a machine-learned model that predicts operation at characteristic of the computer system from input resource-allocation-state vectors that each describes the resource-allocation-state of a different virtual machine;
 receiving a request that entails changing the resource-allocation state of a virtual machine; and
 processing the received request by,
 generating a set of resource-allocation-state vectors that describe the resource-allocation states of the number of virtual machines in memory,
 inputting the generated set of resource-allocation-state vectors to the machine-learned model,
 receiving, from the machine-learned model, predicted operational characteristics of the computer system for the number of virtual machines with resource allocation states described by the generated set of resource-allocation-state vectors, and
 when the predicted operational characteristics indicate operational non-optimality, unpredictability, and/or instability,
 modifying processing of the request to prevent the predicted operational non-optimality, unpredictability, add/or instability,
 wherein the operational characteristics predicted by the machine-learned model include utilizations for each of one or more computational resources by each of the number of virtual machines.

16. The method of claim 15 wherein the predicted operational characteristics indicate operational non-optimality, unpredictability, and/or instability when the ratio of the demand for computational resource to the predicted utilization of the resource exceeds a threshold value for a virtual machine.

17. The virtualization layer of claim 15 wherein each resource-allocation-state vector includes a sub-resource-allocation-state vector for each of a number of computational resources used by a virtual machine, each sub-resource-allocation-state vector for a computational resource used by the virtual machine including:
 an indication of a portion of the computational resource currently allocated to the virtual machine;
 an indication of the portion of the computational resource that is currently demanded by the virtual machine;
 an indication of the current reservation for the virtual machine for the computational resource;
 an indication of the current limit for the computational resource for the virtual machine; and
 an indication of the current share for the computational resource for the virtual machine.

18. The virtualization layer of claim 15 wherein the machine-learned model is a neural network.

19. A physical data-storage device that stores computer instructions that, when executed by one or more processors of a computer system that includes the one or more processors, memory, data-storage devices, and networking components, control a virtualization layer to:
 provide a machine-learned model that predicts operational characteristics of the computer system from input resource-allocation-state vectors that each describes the resource-allocation state of a different virtual machine;
 receive a request that entails changing the resource-allocation state of a virtual machine; and process the received request by,
 generating a set of resource-allocation-state vectors that describe the resource-allocation states of the number of virtual machines in memory,
 inputting the generated set of resource-allocation-state vectors to the machine-learned model,
 receiving, from the machine-learned model, predicted operational characteristics of the computer system for the number of virtual machines with resource allocation states described by the generated set of resource-allocation-state vectors, and
 when the predicted operational characteristics indicate operational non-optimality, unpredictability, and/or instability,
 modifying processing of the request to prevent the predicted operational non-optimality, unpredictability, add/or instability,
 wherein the operational characteristics predicted by the machine-learned model include utilizations for each of one or more computational resources by each of the number of virtual machines.

* * * * *